US 9,368,823 B2

(12) United States Patent
Mohanram

(10) Patent No.: US 9,368,823 B2
(45) Date of Patent: Jun. 14, 2016

(54) SOLID OXIDE FUEL CELL ARTICLES AND METHODS OF FORMING

(71) Applicant: Aravind Mohanram, Northborough, MA (US)

(72) Inventor: Aravind Mohanram, Northborough, MA (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 697 days.

(21) Appl. No.: 13/708,773

(22) Filed: Dec. 7, 2012

(65) Prior Publication Data
US 2013/0154147 A1 Jun. 20, 2013

Related U.S. Application Data

(60) Provisional application No. 61/568,057, filed on Dec. 7, 2011.

(51) Int. Cl.
| | |
|---|---|
| *H01M 8/02* | (2006.01) |
| *H01M 8/10* | (2006.01) |
| *H01M 8/12* | (2006.01) |
| *H01M 4/86* | (2006.01) |
| *H01M 4/90* | (2006.01) |

(52) U.S. Cl.
CPC ............ *H01M 8/1246* (2013.01); *H01M 4/861* (2013.01); *H01M 8/1213* (2013.01); *H01M 4/9033* (2013.01); *H01M 8/1253* (2013.01); *H01M 2008/1293* (2013.01); *Y02E 60/521* (2013.01); *Y02E 60/525* (2013.01); *Y02P 70/56* (2015.11)

(58) Field of Classification Search
CPC ............ H01M 8/1213; H01M 8/1246; H01M 8/1253; H01M 4/861; H01M 4/9033
See application file for complete search history.

(56) References Cited

U.S. PATENT DOCUMENTS

| | | | |
|---|---|---|---|
| 3,284,243 A | 11/1966 | Von Sturm | |
| 5,629,103 A * | 5/1997 | Wersing et al. | 429/480 |
| 6,492,051 B1 * | 12/2002 | Gopalan et al. | 429/486 |
| 6,613,384 B1 | 9/2003 | Waller | |
| 7,186,368 B2 | 3/2007 | Simwonis et al. | |
| 7,534,519 B2 | 5/2009 | Cable et al. | |
| 7,736,787 B2 | 6/2010 | Day et al. | |
| 2004/0185327 A1 | 9/2004 | Gorte et al. | |
| 2006/0063052 A1 | 3/2006 | Hu et al. | |
| 2007/0048555 A1 * | 3/2007 | Blake et al. | 429/12 |

(Continued)

FOREIGN PATENT DOCUMENTS

| | | |
|---|---|---|
| EP | 1318560 A2 | 6/2003 |
| EP | 1467421 A2 | 10/2004 |

(Continued)

OTHER PUBLICATIONS

International Search Report for PCT/US2012/068611 dated Mar. 28, 2013, 2 pages.

(Continued)

*Primary Examiner* — Kenneth Douyette
(74) *Attorney, Agent, or Firm* — Abel Law Group, LLP

(57) ABSTRACT

A solid oxide fuel cell (SOFC) article including a SOFC unit cell having a functional layer of an average thickness of not greater than about 100 μm, wherein the functional layer has a first type of porosity having a vertical orientation, and the first type of porosity has an aspect ratio of length:width, the width substantially aligned with a dimension of thickness of the functional layer.

20 Claims, 10 Drawing Sheets

(56) References Cited

U.S. PATENT DOCUMENTS

| | | | |
|---|---|---|---|
| 2007/0178366 A1 | 8/2007 | Mahoney et al. | |
| 2008/0107949 A1* | 5/2008 | Yoshie et al. | 429/33 |
| 2009/0136821 A1 | 5/2009 | Gottmann et al. | |
| 2010/0143824 A1 | 6/2010 | Tucker et al. | |
| 2010/0151345 A1 | 6/2010 | Salvatore et al. | |
| 2010/0167164 A1 | 7/2010 | Reilly et al. | |
| 2011/0045386 A1 | 2/2011 | Cable et al. | |
| 2011/0089028 A1 | 4/2011 | Larsen | |

FOREIGN PATENT DOCUMENTS

| | | |
|---|---|---|
| EP | 2237357 A1 | 6/2010 |
| JP | H0656554 A | 3/1994 |
| JP | 2006-344543 A | 12/2006 |
| JP | 2008004422 A | 1/2008 |
| JP | 2009-522748 A | 6/2009 |
| KR | 1020100104153 A | 9/2010 |
| WO | 2004/004052 A2 | 1/2004 |
| WO | 2011121572 A1 | 10/2011 |

OTHER PUBLICATIONS

X. Wang et al., "Microstructure evolution in thin zirconia films: Experimental observation and modelling," Science Direct, Acta Materialia 59 (2011) 2514-2525.

David J. Green et al., "Constrained sintering: A delicate balance of scales," Science Direct, Journal of the European Ceramic Society 28 (2008) 1451-1466.

EP Office Action for EP 12 85 5215 dated Oct. 13, 2015, 2 pages.

\* cited by examiner

300

| 301 |
| 302 |
| 303 |
| 304 |
| 305 |
| 306 |
| 307 |
| 308 | ns
SOLID OXIDE FUEL CELL ARTICLES AND METHODS OF FORMING

CROSS-REFERENCE TO RELATED APPLICATION

This application claims priority to U.S. Provisional Patent Application No. 61/568,057 filed on Dec. 7, 2011, entitled "Solid Oxide Fuel Cell Articles and Methods of Forming," and naming Aravind Mohanram as inventor, which is incorporated by reference herein in its entirety.

BACKGROUND

1. Field of the Disclosure

The following is directed to solid oxide fuel cells (SOFCs) and methods of forming SOFCs, and particularly directed to a single, sintering process of forming a SOFC unit cell.

2. Description of the Related Art

A fuel cell is a device that generates electricity by a chemical reaction. Among various fuel cells, solid oxide fuel cells (SOFCs) use a hard, ceramic compound metal (e.g., calcium or zirconium) oxide as an electrolyte. Typically, in solid oxide fuel cells, an oxygen gas, such as $O_2$, is reduced to oxygen ions ($O^{2-}$) at the cathode, and a fuel gas, such as $H_2$ gas, is oxidized with the oxygen ions to form water at the anode.

In some instances, fuel cells assemblies have been designed as stacks, which include a cathode, anode, and solid electrolyte between the cathode and the anode. Each stack can be considered a subassembly, which can be combined with other stacks to form a full SOFC article. In assembling the SOFC article, electrical interconnects can be disposed between the cathode of one stack and the anode of another stack.

However, stacks of individual fuel cells can be susceptible to damage caused by fluctuation in temperature during their formation or use. Specifically, materials employed to form the various components, including ceramics of differing compositions, exhibit distinct material, chemical, and electrical properties that can result in breakdown and failure of the SOFC article. In particular, fuel cells have a limited tolerance for changes in temperature. Problems associated with mechanical stress caused by changes in temperature are exacerbated when individual fuel cells are stacked. Limited thermal shock resistance of fuel cells, particularly of fuel cells assembled in stacks, limits the yield of production and poses a heightened risk of failure during operation.

Moreover, the fabrication of SOFC articles has its own set of concerns. Concerns associated with layering and sintering of the compositionally different layers is one of the most formidable challenges in SOFC manufacturing. Current approaches focus on multi-step firing processes and the use of metallic interconnect materials. The industry continues to demand improved SOFC articles and methods of forming.

SUMMARY

According to a first aspect, a solid oxide fuel cell (SOFC) article comprises a SOFC unit cell including a functional layer having an average thickness of not greater than about 100 μm, wherein the functional layer comprises a first type of porosity having a vertical orientation, wherein the first type of porosity has an aspect ratio of length:width, the length substantially aligned with a dimension of thickness of the functional layer.

According to another aspect, a solid oxide fuel cell (SOFC) article comprises a SOFC unit cell including a functional layer disposed between an electrode and a dense layer, the functional layer having an average thickness of not greater than about 100 μm, wherein a portion of a porosity of the functional layer comprises a first type of porosity having a length and a width, the length greater than the width, and wherein a majority of the first type of porosity has a vertical orientation, wherein the dimension of length defines a pore axis, the pore axis forming an angle that is greater than about 45 degrees from a horizontal axis defining a width of the functional layer.

In yet another aspect, a solid oxide fuel cell (SOFC) article includes a SOFC unit cell comprising a functional layer having an average thickness of not greater than about 100 microns, wherein a portion of a porosity of the functional layer includes a first type of porosity having an aspect ratio of length:width of at least about 1.1:1 and a vertical orientation with respect to a horizontal axis defining a width of the functional layer and a second type of porosity having a non-vertical orientation with respect to the horizontal axis of the functional layer.

In still another aspect, a method of forming a solid oxide fuel cell SOFC article includes forming a green functional layer having a content of pore forming agents having a median size of less than about 20 μm, and pressing the green functional layer to form a finished functional layer with a force applied along a vertical axis, wherein during pressing a portion of the porosity within the functional layer changes shape and has a vertical orientation, wherein the finished functional layer comprises an average thickness of not greater than about 100 μm.

According to another aspect, a method of forming a solid oxide fuel cell SOFC article, the method comprising forming a green functional layer having a content of pore forming agents, and uniaxial hot pressing the green functional layer to form a finished functional layer under transformation conditions selected from the group of conditions consisting of temperature, pressure, time, and atmosphere, wherein a significant portion of pores formed from the pore forming agents vertically orient with respect to a horizontal axis during uniaxial hot pressing.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
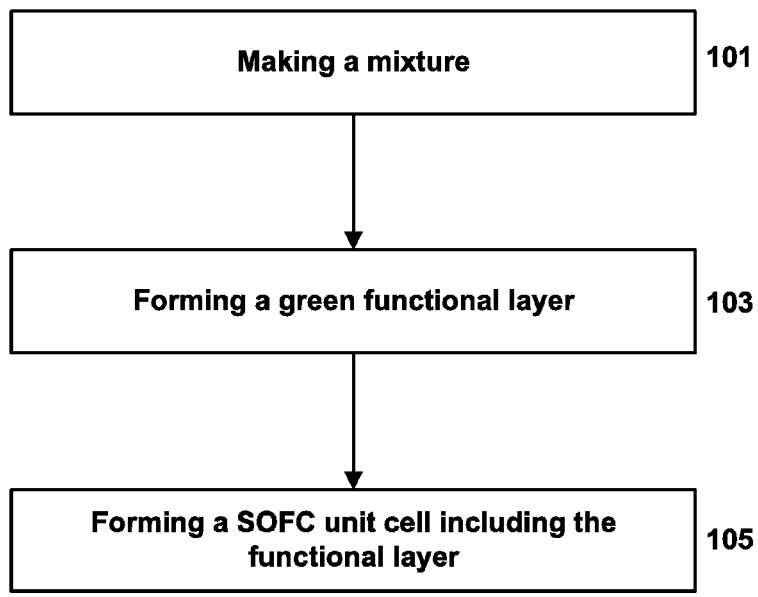
FIG. 1 includes a flow chart illustrating a method of making a SOFC article in accordance with an embodiment.

FIG. 1 includes a flow chart illustrating a method of forming a solid oxide fuel cell (SOFC) article in accordance with an embodiment. As illustrated the process can be initiated at step 101 by making a mixture. The mixture can include the raw material components utilized for forming a functional layer to be part of the SOFC unit cell.

In accordance with an embodiment can include a raw material powder suitable for forming the functional layer, including for example, an inorganic material, such as a ceramic material. For example, the raw material powder can include one or more oxide materials or a combination of different oxide materials. Some suitable oxides can include zirconia ($ZrO_2$), and more particularly, zirconia-based materials that can incorporate other elements such as stabilizers or dopants, which can include elements such as yttria (Y), ytterbium (Yb), cerium (Ce), scandium (Sc), samarium (Sm), gadolinium (Gd), lanthanum (La), praseodymium (Pr), neodymium (Nd), and a combination thereof. Particular examples of suitable oxide raw material powder materials include $Y_2O_3$-doped $ZrO_2$, $Yb_2O_3$-doped $ZrO_2$, $Sc_2O_3$-doped and $CeO_2$-doped $ZrO_2$, and a combination thereof. Alternative or additionally, the raw material powder can include a lanthanide-based materials, such as lanthanum strontium manganite (LSM) material. The lanthanum manganite material can be doped and have a general composition represented by the formula, $(La_{1-x}A_x)_yMnO_{3-\delta}$, where the dopant material is designated by "A" and is substituted within the material for lanthanum (La), on the A-sites of the perovskite crystal structure. The dopant material can be selected from alkaline earth metals, lead, or generally divalent cations having an atomic ratio of between about 0.4 and 0.9 Angstroms. As such, according to one embodiment, the dopant material is selected from the group of elements consisting of Mg, Ba, Sr, Ca, Co, Ga, Pb, and Zr. Some exemplary lanthanide-based materials include $La_{0.8}Sr_{0.2}Ga_{0.8}Mn_{0.2}O_3$, $La_{0.8}Sr_{0.2}Ga_{0.8}Mn_{0.15}Co_{0.5}O_3$, $La_{0.9}Sr_{0.1}Ga_{0.8}Mn_{0.2}O_3$, $LaSrGaO_4$, $LaSrGa_3O_7$, or $La_{0.9}A_{0.1}GaO_3$, wherein A represents one of the elements from the group Sr, Ca, or Ba.

As described above, it will be appreciated that the material of the functional layer can include a combination of oxide components. For example, particular examples of a combination of materials can include, but is not limited to LSM-YSZ, LSCF-YSZ, LCM-YSZ, and LSM-SCSZ.

The mixture may further contain other materials besides the raw material powder utilized to form the functional layer component. For example, the mixture can contain certain additives. In one embodiment one suitable type of additive can be a pore forming agent that may be utilized to form a certain type and content of porosity within the functional layer. In accordance with an embodiment, the pore forming agent may be an inorganic material, an organic material, natural materials, and a combination thereof. Some suitable pore forming agents can include graphite, fibers, natural fibers, cotton, bast fibers, cordage fibers, or animal fibers, such as wool, regenerated cellulose, cellulose diacetate, cellulose triacetate, starch, polyimide, polyester, polyacrylic, polyvinyl, polyolefin resins, or liquid crystal polymers. The pore forming agents may also be a binder material, such as synthetic rubber, thermoplastics, or polyvinyl and plasticizer material such as glycol and phthalate groups. In another embodiment, the material can be pasta, such as spaghetti. In one particular instance, the pore forming agent can include an acrylate, and more particularly, poly(methyl methacrylate) (PMMA). In another embodiment, the pore forming agent can be carbon black. In still another embodiment, the pore forming agent can be graphite.

In certain embodiments, the pore forming agent can be a material having anisotropic properties. For example, the pore forming agent can include an anisotropic microstructure, such as a material have a structure of layers or sheets. In more particular instances, the pore forming agent can include a material having an aspect ratio of length: width of at least 1.3:1, such that the length is measurably greater than the width. According to another embodiment, the aspect ratio of the pore forming agent can be at least about 1.5:1, such as at least about 1.8:1, or even at least about 2:1. Such properties of the pore forming agent may facilitate formation of a SOFC unit cell having the features of the embodiments herein.

Additionally, the mixture can be formed to contain a particular content of the pore forming agent to facilitate the formation of a SOFC unit cell according to the embodiments herein. For example, the mixture can contain at least about 5 wt % pore forming agent for the total weight of the mixture. In other processes, the amount of the pore forming agent may be greater, such as at least about 8 wt %, at least about 10 wt %, at least about 12 wt %, at least about 14 wt %, at least about 16 wt %, at least about 18 wt %, or even at least about 20 wt %. Still, the amount of pore forming agent can be limited, for example, not greater than about 50 wt %, not greater than about 46 wt %, not greater than about 42 wt %, or even not greater than about 38 wt %. It will be appreciated that the amount of pore forming agent in the mixture can be within a range between any of the minimum and maximum values noted above.

In accordance with an embodiment, the pore forming agent incorporated in the mixture may have a particular size suitable for forming a particular type of porosity within the finally-formed functional layer. For example, the pore forming agents may have a median size(i.e., D50) that is less than about 20 microns. In other instances, the median size of the pore forming agents can be less, such as less than about 18 microns, less than about 15 microns, less than about 12 microns, less than about 10 microns, less than about 9 microns, less than about 8 microns, less than about 7 microns, or even less than about 6 microns. Still the median size of the pore forming agents can be at least about 0.01 microns, such as at least about 0.05 microns, such as at least about 0.1 microns, at least about 0.5 microns, or even at least about 1 micron. It will be appreciated that the median size of the pore forming agents can be within a range between any of the minimum and maximum values noted above.

Moreover, the pore forming agents within the mixture can have a median size in a particular relationship to the median particle size of the raw material powder components, and particularly the oxide raw material powder(s). For example, the pore forming agents may have a median size that is substantially similar to the median particle size of the LSM raw material powder particles (i.e., within 5% of the median particle size of the LSM raw material powder). In other instances, the pore forming agents can have a particular size with respect to other components of the raw material powder, such as YSZ. For example, the pore forming agents can have a median size that is substantially the same as the median particle size of the YSZ raw material powder particles (i.e., within 5% of the median particle size of the YSZ raw material powder).

In particular instances, the median particle size (PScp) of any one of the raw materials powders and the median particle size of the pore forming agent (PSpfa) can define a particle size ratio (PScp:PSpfa) of at least about 1:1.1. That is, the median particle size of the pore forming agent can be greater than the median particle size of the raw material powder. In other embodiments, the particle size ratio (PScp:PSpfa) can be at least about 1:1.2, such as at least about 1:1.3, at least about 1:1.4, at least about 1:1.5, at least about 1:2, at least about 1:3, at least about 1:4. Still, in certain non-limiting embodiments, the particle size ratio (PScp:PSpfa) can be not greater than about 1:20, such as not greater than about 1:15, or even not greater than about 1:10. It will be appreciated that the particle size ratio (PScp:PSpfa) can be within a range between any of the minimum and maximum ratios noted above.

In accordance with an embodiment, the raw material powder (e.g., LSM and YSZ raw material powder) may have a median particle size (i.e., D50) of less than about 20 microns. In other instances, the median particle size of the raw material powder can be less, such as not greater than about 18 microns, not greater than about 15 microns, not greater than about 12 microns, not greater than about 10 microns, not greater than about 8 microns, not greater than about 5 microns, or even not greater than about 2 microns. Still the median particle size of the raw material powder used to form the functional layer can be at least about 0.01 microns, such as at least about 0.05 microns, at least about 0.1 microns, at least about 0.2 microns, or even at least about 0.5 microns. It will be appreciated that the median particle size of the raw material powder can be within a range between any of the minimum and maximum values noted above.

After forming the mixture at step 101, the process can continue at step 103 by forming a green functional layer from the mixture. Various techniques may be used to form the green functional layer, including for example, casting, printing, depositing, extruding, molding, lamination, die-pressing, gel casting, spray coating, screen printing, roll compaction, injection molding, and a combination thereof and any combination thereof. In one particular instance, the mixture may be formed using a tape casting process to form a smooth thin film in the form of a green functional layer. In particular instances, one or more films of the mixture may be formed from the tape casting method and stacked on top of each other to facilitate formation of a finally-formed functional layer having the desired thickness.

Reference herein to "green" articles is reference to materials that have not undergone sintering to affect densification or grain growth. A green article can be an unfinished article that may be dried and have low water content, but is unfired. A green article can have suitable strength to support itself and other green layers formed thereon.

After forming the green functional layer at step 103, the process can continue at step 105 by forming a SOFC unit cell including a functional layer. In accordance with an embodiment, the SOFC unit cell can be formed by individually forming layers, such as the functional layer, individually in a single process and later combining each of the individual layers in a co-sintering process.

Alternatively, the forming process may combine a series of green layer portions, including for example, a green functional layer, a green electrolyte layer, a green electrode layer, which can be processed simultaneously in a single forming process, to form a unified and integral, co-sintered SOFC unit cell SOFC. In one particular embodiment, the sintering process (i.e., a co-firing process) can be a free-sintering process, wherein the green SOFC unit cell 100 is fired under ambient pressure conditions. That is, external pressure is not necessarily applied to the SOFC unit cell 100 during sintering. The free-sintering process can be conducted at a pressure that is substantially atmospheric pressure taking into account the change in temperature and the atmosphere used during sintering. In particular, during sintering, particular layers, such as the functional layers can be under a tensile stress to facilitate the formation of a SOFC having the features of embodiments herein.

In other instances, one suitable sintering process of forming a SOFC unit cell can include a process that applies heat and/or pressure to the one or more green layers. For example, in one embodiment the process of forming an SOFC cell can include a pressing operation, such as a hot pressing operation. In particular instances, the SOFC cell can be formed through a uniaxial hot pressing operation. In uniaxial hot pressing, a force can be applied to the stack of green layers at a specific temperature and under specific atmospheric conditions for a particular duration to facilitate the formation of a finally-formed and unitary SOFC unit cell.

For example, in one embodiment the SOFC unit cell can be formed through a sintering operation utilizing a force within a range between about 6 N to 20 kN, and more particularly within a range between about 1 kN and about 19 kN, such as between about 2 kN and about 16 kN, between about 5 kN and about 16 kN.

As such, depending upon the area of the green layers, the uniaxial hot pressing operation can be conducted at a pressure applied to the green SOFC unit cell of at least about 0.01 MPa, such as at least about 0.05 MPa, such as at least about 0.1 MPa, at least about 0.5 MPa, or even at least about 1 MPa. Still, in a particular instance, the uniaxial hot pressing operation can be conducted such that the green functional layer is pressed at a pressure that is not greater than about 30 MPa, such as not greater than about 25 MPa, not greater than about 20 MPa, not greater than about 15 MPa, or even not greater than about 13 MPa. It will be appreciated that the uniaxial hot pressing operation can be conducted at a pressure within a range between any of the minimum and maximum pressures noted above.

Furthermore, the process of sintering, including for example, a uniaxial hot pressing operation, can be conducted at a specific temperature including the maximum temperature at which an isothermal hold is conducted. For example, the temperature utilized during uniaxial hot pressing (i.e., the isothermal hold temperature) can be at least about 900° C., such as at least about 1000° C., such as at least about 1100° C., at least about 1150° C., or even at least about 1200° C. Still, the temperature can be not greater than about 1800° C., such as not greater than about 1700° C., not greater than about 1500° C., or even not greater than about 1400° C. It will be appreciated that the temperature utilized during uniaxial hot pressing can be within a range between any of the minimum and maximum temperatures noted above.

Furthermore, uniaxial hot pressing may be conducted for a specific time period to facilitate the formation of a SOFC unit cell having the features according to the embodiments herein. For example, uniaxial hot pressing can be conducted for a time period of at least about 15 minutes at the isothermal hold. In other embodiments, the duration can be longer, such as at least about 1 hour, at least about 2 hours, or even at least about 4 hours. Still, the duration of isothermal hold utilized during uniaxial hot pressing can be not greater than about 48 hours, such as not greater than about 24 hours, not greater than about 12 hours, or even not greater than about 6 hours.

Furthermore, a specific atmosphere may be utilized during uniaxial hot pressing to facilitate the formation of a SOFC unit cell having the features described herein. For example, the atmosphere utilized during uniaxial hot pressing may be a non-reducing atmosphere. More particularly, the atmosphere during uniaxial hot pressing may be an oxidizing atmosphere. Alternatively, it may be conducted in a reducing atmosphere. In one instance, the atmosphere can have a certain pressure including for example a pressure that is less than typical ambient atmospheric pressure. In one particular instance, the pressure of the atmosphere utilized during uniaxial hot pressing can be not greater than about $10^{-1}$ atm, such as not greater than about $10^{-3}$ atm, or even not greater than about $10^{-4}$ atm. Still, the atmospheric pressure utilized during uniaxial hot pressing may be at least about $10^{-20}$ atm.

After forming the SOFC unit cell at step 105 other processes can be undertaken to facilitate the formation of a finally-formed solid oxide fuel cell article. For example, additional steps may be undertaken to join additional layers to the SOFC unit cell and form a SOFC article. For example, a second sintering process can be completed to join the SOFC unit cell with other layers, including but not limited to, an electrode layer, electrolyte layer, interconnect layer, and a combination thereof. The second sintering process can be separate from the first, sintering process used to form the SOFC unit cell.

In a particular embodiment, the second sintering process can be a free-sintering process. The second sintering process can be conducted at a bonding or joining sintering temperature that is significantly below the first sintering temperature used to form the SOFC unit cell. Moreover, the joining temperature can be below the sintering temperature used to form other components, such as an integral cathode unit cell. In particular instances, the joining temperature can be at least about 5° C., such as at least about 8° C., at least about 10° C., or even at least about 12° C. below the sintering temperature of the first sintering process.

The joining process noted in the foregoing paragraph may be undertaken according to alternative processing routes. For example, the joining process can be a two-step process, wherein the SOFC unit cell can be formed as described herein in a single, sintering process, while a second unit cell (e.g., an electrode unit cell) can be formed and joined in a green state with the sintered SOFC unit cell. The joining process of the two-step process can utilize a joining temperature that is different than the sintering temperature, and particularly, a lower joining temperature than the sintering temperature used in the free-sintering process for forming the SOFC unit cell.

In another embodiment, the joining process can be a three-step process, wherein the SOFC unit cell can be formed as described herein in a single, sintering process, while a second unit cell (e.g., an electrode unit cell) can be formed and sintered separately from the SOFC unit cell. The sintered SOFC unit cell and sintered electrode unit cell can be joined in a third thermal treatment. The third thermal treatment can utilize a joining temperature that is different than the sintering temperatures used to form the SOFC unit cell or the electrode unit cell. In particular, the joining temperature can be a lower temperature than the sintering temperature used in the sintering process for forming the SOFC unit cell and a lower temperature than the sintering temperature used in forming the sintered electrode unit cell.

Figure 2:
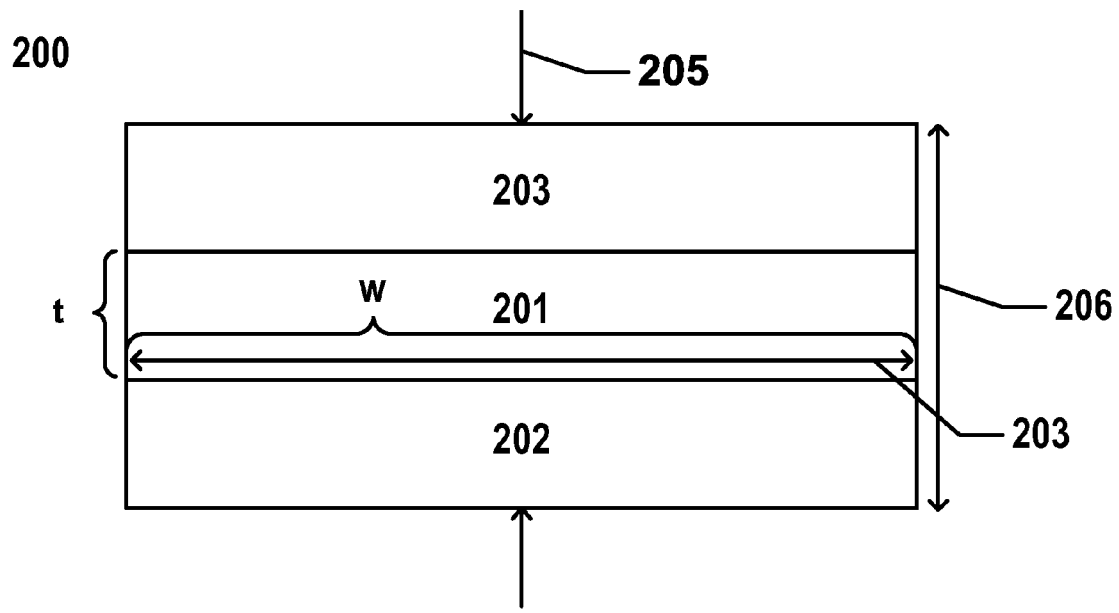
FIG. 2 includes a cross-sectional illustration of an SOFC unit cell in accordance with an embodiment.

FIG. 2 includes an illustration of a SOFC unit cell in accordance with an embodiment. As illustrated, the unit cell 200 can include a functional layer 201, a dense layer 203 overlying the functional layer 201, and a first electrode 202 underlying the functional layer 201. As further illustrated, the functional layer 201 can be formed such that it has a thickness (t) having a dimension defined by the vertical axis 206. Furthermore, as illustrated in FIG. 2, the vertical axis 206 can be substantially aligned with and correspond to an axis 205 defining the direction of force applied during uniaxially hot pressing. Additionally, the functional layer 201 can have a width (w) defined as a dimension extending along a horizontal axis 207 of the functional layer 201. As illustrated, the vertical axis 206 can be substantially perpendicular to the horizontal axis 207. In accordance with an embodiment, the functional layer can have a vertical axis 206 corresponding to a direction of force 205 that is applied during a pressing operation to form the SOFC unit cell 200. In particular, the vertical axis 206 can be perpendicular to the horizontal axis 207. Additionally, the vertical axis 206 can extend in a direction parallel to the thickness (t) of the functional layer 201.

In accordance with an embodiment, the functional layer 201 can be made of a material having the composition of the raw material powder forming the mixture as described herein. In particular, the functional layer 201 can include one or more oxide materials or a combination of different oxide materials. Some suitable oxides can include zirconia ($ZrO_2$), and more particularly, $Y_2O_3$-doped $ZrO_2$. Alternative or additionally, the raw material powder can include a lanthanide-based materials, such as lanthanum strontium manganite (LSM) material. The lanthanum manganite material can be doped and have a general composition represented by the formula, $(La_{1-x}A_x)_yMnO_{3-\delta}$.

In particular instances, the amount of LSM within the mixture of raw materials can be greater than the amount of YSZ within the mixture based on weight percent of the constituent powders. In other embodiments, the amount of LSM can be substantially the same as the amount of YSZ within the mixture. In still other instances, the amount of YSZ within the mixture can be greater than the amount of LSM within the mixture. According to one embodiment, the mixture is formed to include LSM and YSZ, such that the ratio of LSM/YSZ is within a range between about 40/60 to 60/40.

According to another embodiment, the functional layer 201 can be formed such that is has a substantially uniform thickness (t) extending along the width (w) of the functional layer 201. In particular, the functional layer may be formed to have an average thickness that is not greater than about 100 microns. In other instances, the average thickness of the functional layer 201 can be less, such that it is not greater than about 90 microns, such as not greater than about 80 microns, not greater than about 70 microns, not greater than about 60 microns, not greater than about 50 microns, not greater than about 40 microns, or even not greater than about 30 microns. Still, the average thickness of the functional layer 201 can be at least about 1 micron, such as at least about 3 microns, at least about 5 microns, or even at least about 10 microns. It will appreciated that the average thickness of the functional layer 201 can be within a range between any of the minimum and maximum average thickness values noted above.

In accordance with an embodiment, the functional layer 201 can be formed such that it has a total content of porosity for the total volume of the functional layer that is not greater than about 45 vol %. In other embodiments, the amount of porosity within the functional layer 201 can be less, such as not greater than about 40 vol %, not greater than 35 vol %, or even not greater than about 33 vol %. Still, in one embodiment the functional layer can be formed such that it has a total content of porosity of at least about 5 vol %, such as at least about 12 vol %, such as at least about 15 vol %, at least about 18 vol %, or even at least about 20 vol % porosity for the total volume of the functional layer 201. It will appreciated, that the total content of porosity within the functional layer 201 can be within a range between any of the minimum and maximum average porosity values noted above.

Additionally, the functional layer 201 can be formed to have a particular type of porosity. For example, the functional layer 201 can have a first type of porosity having a particular aspect ratio which is a measure of the length to the width of pores as viewed in cross-section. Generally, pores can be viewed in cross-section using a scanning electron microscope under suitable magnification (e.g. 2000× or 5000×) suitable for viewing a suitable sampling of pores within the functional layer 201. It will be appreciated that reference to aspect ratio of the pores is a ratio of length:width, wherein the length is the longest dimension of the pore as viewed in cross-section and the width is the shortest dimension of the pore as viewed in cross-section. In accordance with an embodiment, the first type of porosity within the functional layer 201 can have an aspect ratio (length:width) of at least 1.1:1. In other embodiments, the aspect ratio can be at least about 1.2:1, such as at least about 1.3:1, at least about 1.4:1, at least about 1.5:1, at least about 1.6:1, at least about 1.7:1, at least about 1.8:1, at least about 1.9:1, or even at least about 2:1. Still, in certain other embodiments, the aspect ratio (length:width) of the first type of porosity within the functional layer 201 can be not greater than about 100:1. It will be appreciated that the aspect ratio of the pores of the first type of porosity within the functional layer 201 can be within a range between any of the aspect ratios noted above.

In accordance with an embodiment, the first type of porosity of the functional layer 201 can account for a significant amount of the total volume of porosity of the functional layer 201. A significant amount can be a measurable amount readily identified through available characterization techniques. In accordance with an embodiment, the first type of porosity can be present in the functional layer 201 in an amount of at least about 5% for the total volume of porosity of the functional layer 201. In other instances, the amount of the first type of porosity present within the functional layer 201 can be greater, such as at least about 20%, at least about 30%, at least about 40%, at least about 50%, at least about 60%, at least about 70%, at least about 80%, or even at least about 90% of the total volume of porosity of the functional layer 201. It will be appreciated that the content of the first type of porosity of the functional layer 201 can be within a range between any of the minimum and maximum values noted above.

The first type of porosity present within the functional layer 201 can have an average pore size not greater than about 25 microns. In other embodiments, the average pore size of the first type of porosity within the functional layer 201 can be smaller, such as not greater than about 20 microns, not greater than about 15 microns, not greater than about 12 microns, or even not greater than about 10 microns. In other instances, the average pore size of the first type of porosity within the functional layer 201 can be at least about 0.01 microns, such as at least about 0.05 microns, at least about 0.07 microns, or even at least about 0.1 microns. It will be appreciated that the average pore size of the first type of porosity of the functional layer 201 can be within a range between any of the minimum and maximum values noted above.

Figures 3, 4:
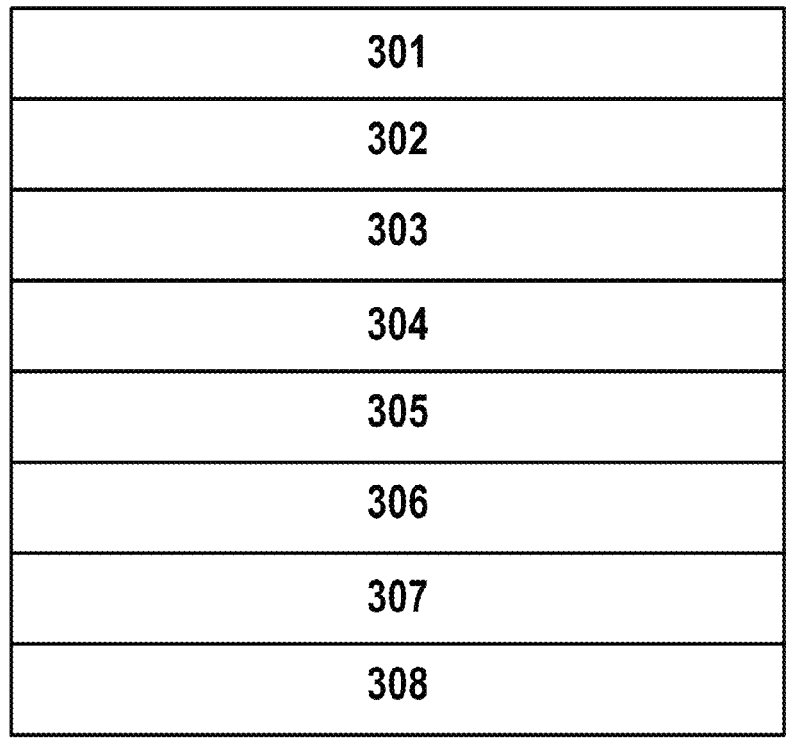
FIG. 3 includes an illustration of an SOFC unit cell in accordance with an embodiment.
FIG. 4 includes an illustration of a pore having a vertical orientation in accordance with an embodiment.

In more particular instances, the first type of porosity may be related to intrinsic porosity, which is porosity that is formed within the finally-formed functional layer 201 without the use of pore formers. Additionally, the first type of porosity may be related to extrinsic porosity, which is porosity formed through the use of pore formers. Notably, in particular instances the first type of porosity can be related to a combination of intrinsic and extrinsic porosity, wherein certain combination of processing parameters and materials utilized during the process facilitate formation of a first type of porosity having a vertical orientation within the functional layer 201. Referring briefly to FIG. 4, a cross-sectional illustration of a pore having a vertical orientation is provided. As illustrated, the pore 401 has a pore axis 402 defining a length of the pore 401. As further illustrated, the pore 401 is placed on X-Y coordinates wherein the X-axis corresponds to the horizontal axis 207 of the functional layer 201 and the Y-axis corresponds to the vertical axis 206 of the functional layer 201, and particularly the thickness (t) of the functional layer 201. According to an embodiment, the pore 401 can have a vertical orientation such that the pore 401 has an orientation angle ($\alpha$) (403) defined as an angle between the pore axis 402 and the horizontal axis 207. As illustrated, a pore having a vertical orientation can have an orientation angle 403 greater than 45°, as in FIG. 4. In accordance with an embodiment, the orientation angle 403 of the first type of porosity within the functional layer having a vertical orientation can be greater than about 46°, such as greater than about 48°, greater than 50°, greater than 52°, greater than about 54°, greater than about 56°, greater than about 58°, or even greater than about 60°.

According to a certain embodiment, the functional layer 201 can have a first type of porosity including pores having a vertical orientation, and more particularly, the average orientation angle for all of the first type of pores can be within a range between about 46° and about 90°, such as between about 46° and about 80°, between about 46° and about 75°, between about 46° and about 73°, between about 46° and about 70°, between about 46° and about 68°, between about 46° and about 65°, between about 46, and about 60°. The method of measuring the pore orientation is detailed in Example 1.

In accordance with another embodiment, the functional layer 201 can be formed to have a second type of porosity that is different than the first type of porosity. In particular, the second type of porosity can have a generally random orientation. Random orientation can be a pore that does not have a suitable aspect ratio to define a pore axis, and therefore define a particular orientation of the pore, or alternatively a pore having an orientation angle of 45°. In accordance with an embodiment, the second type of porosity can be present in an amount within the functional layer 201 that is greater than the content (vol %) of the first type of porosity. Alternatively, the first type of porosity can be present in an amount that is greater than the amount (vol %) of the second type of porosity within the functional layer 201.

Figure 5:
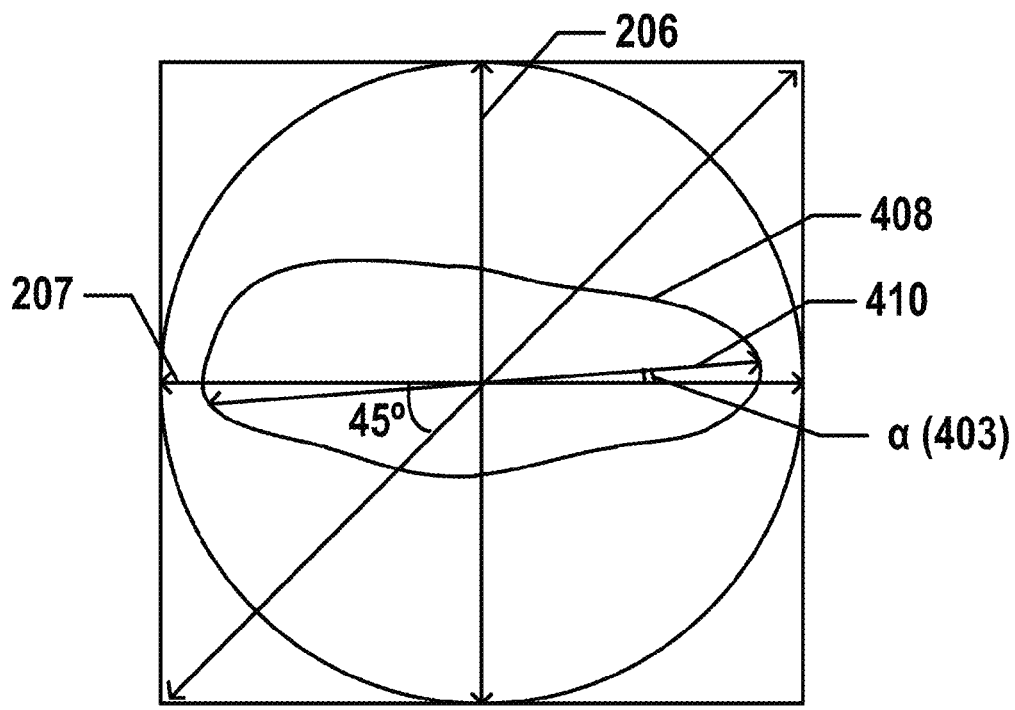
FIG. 5 includes an illustration of a pore having a horizontal orientation in accordance with an embodiment.

In another embodiment, the functional layer 201 can include a third type of porosity, distinct from the first and second types of porosity. The third type of porosity can be defined by pores having a horizontal orientation. Turning briefly to FIG. 5, a pore having a horizontal orientation is illustrated. As illustrated, the pore 408 can have a particular aspect ratio including a pore axis 410 extending along the longest dimension (i.e., length) of the pore 408. As further illustrated, the horizontal axis 207 and vertical axis 206 are overlying the cross-sectional view of the pore 408 as the X-axis and Y-axis, respectively. The pore axis 410 can form an angle ($\alpha$) (403) between the horizontal axis 207 and the pore axis 410. In accordance with an embodiment, the pore 408 can have a horizontal orientation such that the orientation angle 403 is less than 45°. In accordance with an embodiment, the orientation angle of the third type of porosity can be less than about 43°, such as less than 42°, such as less than about 41°, less than about 40°, or even less than 38°.

According to a certain embodiment, the functional layer 201 can have a third type of porosity including pores having a horizontal orientation, and more particularly, the average orientation angle for all of the third type of pores can be less than 45°, less than 44°, and more particularly, within a range between about 25° and about 44°, within a range between about 28° and about 44°, within a range between about 30° and about 44°, within a range between about 35° and about 44°, and more particularly within a range between about 38° and about 43°.

The third type of porosity can be generally present as a result of the incorporation of certain types of pore forming agents within the mixture utilized to form the functional layer 201. That is, the third type of porosity may be formed primarily as extrinsic pores via pore forming agents, and more particularly, can exist entirely as extrinsic pores due to the use pore forming agents. Accordingly, the third type of porosity may have significantly smoother edges as compared to the first type of porosity having a vertical orientation. As such, in accordance with an embodiment, the first type of porosity can include pores having substantially irregular edges.

In accordance with an embodiment, the functional layer 201 can be formed such that the third type of porosity has an average pore size that is greater than the average pore size of the first type of porosity. Still, in other embodiments, the third type of porosity within the functional layer 201 can have an average pore size that is less than the average pore size of the first type of porosity. In yet another embodiment, the third type of porosity and first type of porosity can have average pore sizes that are substantially the same.

In particular instances, the functional layer 201 can be formed such that the third type of porosity has an average pore size (measured as the average of the greatest dimension) that is not greater than about 25 microns. In other embodiments, the average pore size of the third type of porosity within the functional layer can be less, such as not greater than about 20 microns, not greater than about 15 microns, not greater than about 12 microns, or even not greater than about 10 microns. Yet, in another embodiment, the average pore size of the third type of porosity within the functional layer 201 can be at least about 0.01 microns, such as at least about 0.05 microns, at least about 0.07 microns, or even at least about 0.1 microns. It will be appreciated that the average pore size of the third type of porosity can be within a range between any of the minimum and maximum values noted above.

In accordance with an embodiment, the third type of porosity can be present in an amount that is greater than the amount of the first type of porosity. However, in other specific instances, the third type of porosity can be present in an amount that is less than the amount of the first type of porosity.

In one embodiment, the functional layer 201 can be formed such that the third type of porosity is present in a significant amount for the total volume of porosity of the functional layer 201. For example, the third type of porosity can be present in an amount of at least about 5%, such as at least about 20%, at least about 40%, at least about 60%, or even at least about 80% for the total volume of porosity within the functional layer. However, in particular instances, it is suitable that the third type of porosity may be limited, such that it is not present in amounts not greater than about 80%, not greater than about 70%, not greater than about 60%, not greater than about 50%, or even not greater than about 20% for the total volume of porosity of the functional layer 201. It will be appreciated that the content of the third type of porosity within the functional layer 201 can be within a range between any of the minimum and maximum values noted above.

As illustrated in FIG. 2, the SOFC unit cell 200 can include a dense layer 203 overlying the functional layer 201, and more particularly, can be in direct contact with the functional layer 201. According to one embodiment, the dense layer 203 can have a porosity less than a porosity of the functional layer 201. The dense layer 203 can be formed such that it has a total content of porosity for the total volume of the dense layer 203 that is not greater than about 20 vol %. In other embodiments, the amount of porosity within the dense layer 203 can be less, such as not greater than about 15 vol %, not greater than about 12 vol %, not greater than about 10 vol %, not greater than 8 vol %, or even not greater than about 6 vol %, not greater than about 5 vol %, not greater than about 4 vol %, not greater than about 3 vol %, not greater than about 2 vol %, or even not greater than about 1 vol %.

In particular instances, the dense layer 203 can be an electrolyte layer. The electrolyte layer can include an inorganic material, such as a ceramic material. For example, the electrolyte layer can include an oxide material. Some suitable oxides can include zirconia ($ZrO_2$), and more particularly, zirconia-based materials that can incorporate other elements such as stabilizers or dopants, which can include elements such as yttria (Y), ytterbium (Yb), cerium (Ce), scandium (Sc), samarium (Sm), gadolinium (Gd), lanthanum (La), praseodymium (Pr), neodymium (Nd), and a combination thereof. Particular examples of suitable electrolyte materials can include $Sc_2O_3$-doped $ZrO_2$, $Y_2O_3$-doped $ZrO_2$, $Yb_2O_3$-doped $ZrO_2$, $Sc_2O_3$-doped and $CeO_2$-doped $ZrO_2$, and a combination thereof. The electrolyte layer can also include ceria ($CeO_2$), and more particularly ceria-based materials, such as $Sm_2O_3$-doped $CeO_2$, $Gd_2O_3$-doped $CeO_2$, $Y_2O_3$-doped $CeO_2$, and CaO-doped $CeO_2$. The electrolyte material can also include lanthanide-based materials, such as $LaGaO_3$. The lanthanide-based materials can be doped with particular elements, including but not limited to, Ca, Sr, Ba, Mg, Co, Ni, Fe, and a combination thereof. In particular, the electrolyte material can include a lanthanum strontium manganite (LSM) material. Some exemplary electrolyte materials include $La_{0.8}Sr_{0.2}Ga_{0.8}Mn_{0.2}O_3$, $La_{0.8}Sr_{0.2}Ga_{0.8}Mn_{0.15}Co_{0.8}O_3$, $La_{0.9}Sr_{0.1}Ga_{0.8}Mn_{0.2}O_3$, $LaSrGaO_4$, $LaSrGa_3O_7$, or $La_{0.9}A_{0.1}GaO_3$, wherein A represents one of the elements from the group Sr, Ca, or Ba. According to one particular embodiment, the electrolyte layer 101 can be made of $ZrO_2$ doped with 8 mol % $Y_2O_3$ (i.e., 8 mol % $Y_2O_3$-doped $ZrO_2$). The 8 mol % $Y_2O_3$ can have particular dopants, such as Al and/or Mn to facilitate thermal reaction characteristics and improve the processing characteristics of the electrolyte material. Other exemplary electrolyte materials can include doped yttrium-zirconate (e.g., $Y_2Zr_2O_7$), doped gadolinium-titanate (e.g., $Gd_2Ti_2O_7$) and brownmillerites (e.g., $Ba_2In_2O_6$ or $Ba_2In_2O_5$).

For certain embodiments utilizing an electrolyte layer as the dense layer, 203, the electrolyte layer can be a particularly thin, planar layer of material. For example, the electrolyte layer can have an average thickness of not greater than about 1 mm, such as not greater than about 500 microns, such as not greater than about 300 microns, not greater than about 200 microns, not greater than about 100 microns, not greater than about 80 microns, not greater than about 50 microns, or even not greater than about 25 microns. Still, the electrolyte layer can have an average thickness of at least about 1 micron, such as at least about 2 microns, at least about 5 microns, at least about 8 microns, or at least about 10 microns. It will be appreciated that the average thickness of the electrolyte layer can have an average thickness within a range between any of the minimum and maximum values noted above.

The electrolyte layer can be formed via casting, deposition, printing, extruding, lamination, die-pressing, gel casting, spray coating, screen printing, roll compaction, injection molding, and a combination thereof. The electrolyte layer can be formed individually or subsequently to formation of other layers. For example, the electrolyte layer can be formed on one of the other previously-formed layers (e.g., the functional layer 201).

The electrolyte layer can be formed from a powder electrolyte material having a particular particle size that facilitates formation of a unit cell according to the embodiments herein. For example, the powder electrolyte material can have a median particle size of less than about 100 microns, such as less than about 50 microns, less than about 20 microns, less than about 10 microns, less than about 5 microns, or even less than about 1 micron. Still, in particular instances, the median particle size of the powder electrolyte material can be at least about 0.01 microns, at least about 0.05 microns, at least about 0.08 microns, at least about 0.1 microns, or even at least about 0.2 microns. It will be appreciated that the powder electrolyte material can have a median particle size within a range including any of the minimum and maximum values noted above.

According to an alternative embodiment, the dense layer 203 overlying the functional layer 201 can be an interconnect layer. The interconnect layer may include an inorganic material, such as a ceramic material. In particular, the interconnect layer can include an oxide material, and more particularly, can be a chromite or nickel oxide material. More particularly, the interconnect layer can include an element selected from the group consisting of lanthanum (La), manganese (Mn), strontium (Sr), titanium (Ti), niobium (Nb), calcium (Ca), gallium (Ga), cobalt (Co), yttria (Y), and a combination thereof. In certain instances, the interconnect layer can include a chromium oxide-based materials, nickel oxide-based materials, cobalt oxide-based materials, and titanium oxide-based materials (e.g., lanthanium strontium titanate). In particular, the interconnect layer can be made of a material, such as $LaSrCrO_3$, $LaMnCrO_3$, $LaCaCrO_3$, $YCrO_3$, $LaCrO_3$, $LaCoO_3$, $CaCrO_3$, $CaCoO_3$, $LaNiO_3$, $LaCrO_3$, $CaNiO_3$, $CaCrO_3$, and a combination thereof. In particular, the interconnect layer can comprise LST (or YST), and may consist essentially of Nb doped LST, such as, $La_{0.2}Sr_{0.8}TiO_3$, having one or more dopants. It will be appreciated, that the interconnect material may include an A-site deficient material, wherein for example, the lattice sites typically occupied by lanthanum or strontium cations are vacant, and thus the material has a non-stoichiometric composition.

The interconnect layer can be a particularly thin, planar layer of material. For example, the interconnect layer can have an average thickness of not greater than about 1 mm, such as not greater than about 500 microns, such as not greater than about 300 microns, not greater than about 200 microns, not greater than about 100 microns, not greater than about 80 microns, not greater than about 50 microns, or even not greater than about 25 microns. Still, the interconnect layer can have an average thickness of at least about 1 micron, such as at least about 2 microns, at least about 5 microns, at least about 8 microns, or at least about 10 microns. It will be appreciated that the average thickness of the interconnect layer can have an average thickness within a range between any of the minimum and maximum values noted above.

The interconnect layer can be formed using a process similar to the formation of the electrolyte layer, including for example, casting, deposition, printing, extruding, lamination, die-pressing, gel casting, spray coating, screen printing, roll compaction, injection molding, and a combination thereof. The interconnect layer can be formed individually, or subsequently to formation of other layers, such that the interconnect layer can be formed on one of the other previously-formed layers (e.g., the electrode layer 103).

The interconnect layer can have a coefficient of thermal expansion (CTE) that may be substantially the same as the CTE of the functional layer 201. In particular instances, the CTE of the interconnect layer can be essentially the same as the CTE of the functional layer 201.

The interconnect layer can be formed from a powder interconnect material having a particular particle size that facilitates formation of a unit cell according to the embodiments herein. For example, the powder interconnect material can have a median particle size of less than about 100 microns, such as less than about 50 microns, less than about 20 microns, less than about 10 microns, less than about 5 microns, or even less than about 1 micron. Still, in particular instances, the median particle size of the powder interconnect material can be at least about 0.01 microns, at least about 0.05 microns, at least about 0.08 microns, at least about 0.1 microns, at least about 0.2 microns, or even at least about 0.4 microns. It will be appreciated that the powder interconnect material can have a median particle size within a range including any of the minimum and maximum values noted above.

As further illustrated in FIG. 2, the SOFC unit cell 200 can include an electrode layer 202 underlying the functional layer 201. In particular instances, the electrode layer 202 can be a cathode directly connected to the functional layer 201, which can be a cathode functional layer. In one embodiment, the electrode layer 202 can be made of an inorganic material, such as a ceramic material, and more particularly an oxide. The electrode layer 202 can include a rare earth element. In at least one embodiment, the electrode layer 202 can include elements such as lanthanum (La), manganese (Mn), strontium (Sr), and a combination thereof. In another embodiment, materials for the electrode layer 202 can include lanthanum manganite materials. The electrode layer 202 can be made of a doped lanthanum manganite material, giving the cathode composition a perovskite type crystal structure. Accordingly, the doped lanthanum manganite material can have a general composition represented by the formula, $(La_{1-x}A_x)_yMnO_{3-\delta}$, where the dopant material is designated by "A" and is substituted within the material for lanthanum (La), on the A-sites of the perovskite crystal structure. The dopant material can be selected from alkaline earth metals, lead, or generally divalent cations having an atomic ratio of between about 0.4 and 0.9 Angstroms. As such, according to one embodiment, the dopant material is selected from the group of elements consisting of Mg, Ba, Sr, Ca, Co, Ga, Pb, and Zr. According to a particular embodiment, the dopant is Sr, and the cathode material is a lanthanum strontium manganite material, known generally as LSM.

Referring to the stoichiometry of the doped lanthanum manganite material, according to one embodiment, parameters such as the type of atoms present, the percentage of vacancies within the crystal structure, and the ratio of atoms, particularly the ratio of La/Mn within the cathode material, are provided to manage the formation of conductivity-limiting compositions during the operation of the fuel cell. The formation of conductivity-limiting compositions may reduce the efficiency of the cell and reduces the lifetime of the SOFC. According to one embodiment, the doped lanthanum manganite material comprises $(La_{1-x}A_x)_yMnO_{3-\delta}$, wherein x is not greater than about 0.5, y is not greater than about 1.0, and the ratio of La/Mn is not greater than about 1.0. The value of x within the doped lanthanum manganite composition represents the amount of dopant substituted for La within the structure. According to one embodiment, x is not greater than about 0.5, such as not greater than about 0.4 or 0.3. Still, the amount of dopant provided within the electrode layer 202 material may be less, such that x is not greater than about 0.2, or still 0.1, and particularly within a range of between about 0.4 and 0.05.

In a particular embodiment, the dopant material is Sr (an LSM cathode), such that the electrode layer 202 composition is $(La_{1-x}Sr_x)_yMnO_{3-\delta}$, where x is not greater than about 0.5, such as not greater than about 0.4, 0.3, 0.2 or even not greater than about 0.1, and particularly within a range of between about 0.35 and 0.05. The electrode layer 202 having a dopant concentration as described in the previous embodiments may be desirable for reducing the formation of conductivity-limiting compositions during the operation of the fuel cell.

In further reference to the stoichiometry of the material of the electrode layer 202, the value of y in the general formula $(La_{1-x}A_x)_yMnO_{3-\delta}$ represents the percent occupancy of atoms on the A-site within the crystal lattice. Thought of another way, the value of y may also be subtracted from 1.0 and represent the percentage of vacancies on the A-site within the crystal lattice. For the purposes of this disclosure, a doped lanthanum manganite material having a value of y less than 1.0 is termed an "A-site deficient" structure, since the A-sites within the crystal structure are not 100% occupied. According to one embodiment, y is not greater than about 0.95, such as not greater than about 0.90, 0.88, or even not greater than about 0.85. In a particular embodiment, the material of the electrode layer 202 can be LSM (the dopant material is Sr) having a composition of $(La_{1-x}Sr_x)_yMnO_{3-\delta}$, and the value of y is not greater than about 1.0, such as not greater than about 0.95, 0.93 or even 0.90, and particularly within a range of between about 0.70 and 0.99. An electrode layer 202 having an A-site deficient, doped lanthanum manganite composition, as provided in the previously described embodiments, is desirable for reducing the formation of conductivity-limiting compositions during the operation of the fuel cell.

In further reference to the composition of the doped lanthanum manganite material of the electrode layer 202, according to one embodiment, the ratio of La/Mn can be not greater than about 1.0. The ratio of La/Mn within the material can be modified by the addition of a dopant (the value of x in the general formula) as well as the creation of A-site vacancies (related to the value of y) within the lanthanum manganite crystal structure. As such, in another embodiment, the ratio of La/Mn can be less than 1.0, such as less than about 0.97, 0.95, or even less than about 0.93. According to a particular embodiment, the cathode material can be LSM having a general composition of $(La_{1-x}Sr_8)_yMnO_{3-\delta}$, wherein x is not greater than about 0.5, y is not greater than about 1.0, and the ratio of La/Mn is not greater than 1.0. Accordingly, the ratio of La/Mn within the LSM material may be less than about 1.0, such as less than about 0.97, 0.95 or even 0.90. Generally, a ratio of La/Mn of not greater than 1.0, and particularly less than 1.0, provides a desirable stoichiometric condition that reduces the formation of conductivity-limiting compositions during operation of the SOFC. The formation of such conductivity-limiting compositions may reduce the efficiency and the operable lifetime of the SOFC.

Alternatively, or additionally, the material of the electrode layer 202 can include a La-ferrite based material. Typically, the La-ferrite based material can be doped with one or more suitable dopants, such as Sr, Ca, Ba, Mg, Ni, Co or Fe. Examples of doped La-ferrite based materials include LaSrCo-ferrite (LSCF) (e.g., $La_{1-g}Sr_qCo_{1-j}Fe_jO_3$, where each of q and j independently is equal to or greater than 0.1, and equal to or less than 0.4 and (La+Sr)/(Fe+Co) is in a range of between about 1.0 and about 0.90 (molar ratio). In one specific embodiment, the electrode layer 202 can include a mixture of a La-manganite and La-ferrite material. For example, the electrode layer 202 can include a LaSr-manganite (LSM) (e.g., $La_{1-k}Sr_kMnO_3$) and a LaSrCo-ferrite (LSCF). Common examples include $(La_{0.8}Sr_{0.2})_{0.98}Mn_{3+-\Delta}$ ($\Delta$ is equal to or greater than zero, and equal to or less than 0.3) and $La_{0.6}Sr_{0.4}Co_{42}Fe_{0.8}O_3$.

The electrode layer 202 can have a coefficient of thermal expansion (CTE) that can be substantially the same as the CTE of the functional layer 201, and even substantially the same as the CTE of the dense layer 203.

The electrode layer 202 can be a thin and substantially planar layer of material. The electrode layer 202 can have an average thickness that is greater than the average thickness of the functional layer 201 or the dense layer 203. For example, the electrode layer 202 can have an average thickness of at least about 100 microns, such as at least about 300 microns, at least about 500 microns, at least about 700 microns, or even at least about 1 mm. Still, the electrode layer 202 can have an average thickness of not greater than about 5 mm, such as not greater than about 2 mm, not greater than about 1.5 mm. It will be appreciated that the average thickness of the electrode layer 202 can have an average thickness within a range between any of the minimum and maximum values noted above.

The electrode layer 202 can be formed from a powder electrode material having a particular particle size that facilitates formation of a unit cell according to the embodiments herein. For example, the powder electrode material can have a median particle size of less than about 100 microns, such as less than about 50 microns, less than about 20 microns, less than about 10 microns, less than about 5 microns, or even less than about 1 micron. Still, in particular instances, the median particle size of the powder electrode material can be at least about 0.01 microns, at least about 0.05 microns, at least about 0.08 microns, at least about 0.1 microns, at least about 0.2 microns, or even at least about 0.4 microns. It will be appreciated that the powder electrode material can have a median particle size within a range including any of the minimum and maximum values noted above.

The electrode layer 202 can be a porous layer. The porosity may be in the form of channels, which can be utilized to deliver gas to the SOFC article. The channels may be arranged in a particular manner, such as in a regular and repeating pattern throughout the volume of the electrode layer 202. Any suitable techniques may be used to form the porosity and/or channels, including for example, incorporating shaped fugitives, embossing, cutting channels in tapes and then laminating the tapes to define channels, using extrusion through preforms, using patterned rolls in roll compaction.

In particular instances, the electrode layer 202 can be made of one or more individual layers, including for example a bulk layer portion and a bonding layer portion. In certain constructions, the electrode layer 201 can include bulk layer portion disposed between, and particularly, directly bonded to the functional layer portion 203 and a bonding layer portion.

The bulk layer portion can be a porous layer, having a porosity within a range between about 20 vol % and about 60 vol %, for the total volume of the bulk layer portion. The bulk layer portion can have an average pore size that is significantly greater than an average pore size of pores within the functional layer portion layer or the bonding layer portion. In particular, the bulk layer portion can contain channels for delivery of the gaseous species to other component layers (e.g., the electrolyte layer). The bulk layer portion of the electrode layer 202 can have significantly greater porosity than the functional layer 203.

The green material of the bulk layer portion can be formed of a generally coarser material than the functional layer 201 or the bonding layer portion of the electrode layer 202. In particular instances, the bulk layer portion can be formed of an agglomerated powder. The agglomerates may have a median particle size of between about 1 micron and about 300 microns, such as between about 1 micron and about 200 microns, or even between about 1 micron and about 100 microns. In particular embodiments, coarse particles may be used instead of, or in addition to, an agglomerated powder. The coarse particles can have a median particle size within a range between about 0.1 microns and about 100 microns, such as between about 0.1 microns and about 50 microns, or even between about 0.1 micron and about 15 microns.

The bulk layer portion of the electrode layer 202 can be a thin and substantially planar layer of material, having an average thickness that is greater than the average thickness of the functional layer 201 or the bonding layer portion of the electrode layer 202. In particular, the bulk layer portion can have an average thickness not greater than about 2 mm, such as not greater than about 1 mm, or not greater than about 800 microns. Still, the bulk layer portion can have an average thickness of at least about 50 microns, such as at least about 100 microns, at least about 200 microns, or at least about 500 microns. It will be appreciated that the bulk layer portion can have an average thickness within a range between any of the minimum and maximum values noted above.

The bonding layer portion of the electrode layer 202 can be in direct contact with the bulk layer portion. The bonding layer portion of the electrode layer 202 may also overly, and particularly, directly contact an interconnect layer. The bonding layer portion can include the same materials as the electrode layer 202 described herein.

The bonding layer portion can be a porous layer, having a porosity within a range between about 0 vol % and about 40 vol %, for the total volume of the bonding layer portion. The bonding layer portion can have an average pore size that is significantly less than an average pore size of pores within the bulk layer portion. The bonding layer portion can facilitate suitable electrical characteristics of the finished SOFC article.

The raw material of the bonding layer portion of the electrode layer 202 can be formed of a generally finer material than the raw material of the bulk layer portion of the electrode layer 202. In particular instances, the raw material of the bonding layer portion can be formed of a relatively fine agglomerated powder. The fine agglomerated powder can have an average agglomerate size not greater than about 100 microns, such as not greater than about 75 microns, not greater than about 45 microns, or even not greater than about 20 microns. Still, the median particle size of the fine agglomerated powder can be at least about 0.5 microns, such as at least about 1 micron, or at least about 5 microns. It will be appreciated, that the median particle size of the fine agglomerated powder can be within a range between any of the minimum and maximum values noted above. Additionally, the fine agglomerated powder can be mixed with a largely unagglomerated powder, having a notably finer particle size. Alternatively, the fine agglomerated powder may be partially or wholly substituted with unagglomerated particles. The particular sizes of powder material can facilitate formation of suitable pore sizes and grain sizes within the bonding layer portion.

The bonding layer portion of the electrode layer 202 can be a thin and substantially planar layer of material having an average thickness that is less than the average thickness of the bulk layer portion. In particular, the bonding layer portion can have an average thickness of not greater than about 1 mm, such as not greater than about 700 microns, not greater than about 500 microns, or even not greater than about 200. Still, the bonding layer portion can have an average thickness of at least about 1 micron, such as at least about 5 microns, at least about 10 microns, at least about 20 microns, such as at least about 50 microns, at least about 75 microns, at least about 100 microns. It will be appreciated that the bonding layer portion can have an average thickness within a range between any of the minimum and maximum values noted above.

FIG. 3 includes an illustration of a SOFC unit cell in accordance with an embodiment. The SOFC unit cell 300 can include a cathode bonding layer 308, a cathode bulk layer 307 overlying the cathode bonding layer 308, a cathode functional layer 306 overlying the cathode bulk layer 307, an electrolyte layer 305 overlying the cathode functional layer 306, anode functional layer 304 overlying the electrolyte layer 305, an anode bulk layer 303 overlying the anode functional layer 304, an anode bonding layer 302 overlying the anode bulk layer 303, and an interconnect layer 301 overlying the anode bonding layer 302. As described herein, the SOFC unit cell 300 can be made according to the processes described herein, including for example, uniaxial hot pressing to facilitate the formation of a finally-formed and unitary SOFC unit cell. Moreover, each of the layers of the SOFC unit cell 300 can be in direct contact with each other as depicted.

The cathode bonding layer 308, cathode bulk layer 307, cathode functional layer 306, electrolyte layer 305, anode functional layer 304, and interconnect layer 302 can be made as described in the embodiments herein. Moreover, the cathode bonding layer 308, cathode bulk layer 307, cathode functional layer 306, electrolyte layer 305, anode functional layer 304, anode bulk layer 303, and interconnect layer 301 can have the features of corresponding layers described in other embodiments herein.

The anode bulk layer 303 can be made of a cermet material, that is, a combination of a ceramic and metallic material. Some suitable metals can include transition metal species, including for example, nickel or copper. The anode bulk layer 303 can include an ionic conductor, including for example, a ceramic material, and particularly, an oxide material. For example, the anode bulk layer 303 may be formed with nickel and a zirconia-based material, including for example, yttria-stabilized zirconia. Alternatively, the anode bulk layer 303 can include a ceria-based material, including for example, gadolinium oxide-stabilized ceria. The nickel can be produced through the reduction of nickel oxide included in the anode green material. Alternatively, it will be appreciated that certain other types of oxide materials may be used in the anode bulk layer 303, such as titanites, manganites, chromites, a combination thereof, and the like. It will be appreciated, that such oxides may also be perovskite materials.

As illustrated, the SOFC unit cell can include an anode made of a plurality of layers including a functional layer portion 304, a bulk layer portion 303, and a bonding layer portion 302. The anode bulk layer 303 can be a porous layer, having a porosity within a range between about 20 vol % and about 60 vol %, for the total volume of the layer. The anode bulk layer 303 can have an average pore size that is significantly greater than an average pore size of pores within the anode functional layer portion layer or the anode bonding layer portion. In particular, the anode bulk layer 303 can contain channels for delivery of the gaseous species to other component layers (e.g., the electrolyte layer). The anode bulk layer 303 can have significantly greater porosity than the functional layer.

The green material of the anode bulk layer 303 can be formed of a generally coarser material than the anode functional layer 304 or the anode bonding layer 302 portion of the anode. In particular instances, the anode bulk layer 303 can be formed of an agglomerated powder. The agglomerates may have a median particle size of between about 1 micron and about 300 microns, such as between about 1 micron and about 200 microns, or even between about 1 micron and about 100 microns. In particular embodiments, coarse particles may be used instead of, or in addition to, an agglomerated powder. The coarse particles can have a median particle size within a range between about 0.1 microns and about 100 microns, such as between about 0.1 microns and about 50 microns, or even between about 0.1 micron and about 15 microns.

The anode bulk layer 303 can be a thin and substantially planar layer of material, having an average thickness that is greater than the average thickness of the functional layer or the bonding layer portion of the electrode layer of the anode. In particular, the anode bulk layer 303 can have an average thickness not greater than about 2 mm, such as not greater than about 1 mm, or not greater than about 800 microns. Still, the anode bulk layer 303 can have an average thickness of at least about 50 microns, such as at least about 100 microns, at least about 200 microns, or at least about 500 microns. It will be appreciated that the anode bulk layer 303 can have an average thickness within a range between any of the minimum and maximum values noted above.

The anode functional layer 304 may be in direct contact with the electrolyte layer 305, and in particular, can be directly bonded to the electrolyte layer 305. The anode functional layer 304 can include the same materials as the anode bulk layer 303 described herein. Moreover, the anode bonding layer 304 can include the same materials as the anode bulk layer 303 as described herein.

According to one embodiment, the anode functional layer 304 can be a porous layer, having a porosity within a range between about 20 vol % and about 50 vol %, for the total volume of the layer. The anode functional layer 304 can have an average pore size that is significantly smaller than an average pore size of pores within the anode bulk layer 303.

In particular instances, the green material of the anode functional layer 304 can be formed of a relatively fine agglomerated powder. Alternatively, the powder material may be unagglomerated. The powder can have a median particle size not greater than about 100 microns, such as not greater than about 75 microns, and in certain embodiments, not greater than about 45 microns. Additionally, the powder can be a mixture of agglomerated and unagglomerated powders, wherein the unagglomerated powder may have a notably finer particle size. Such sizes can facilitate formation of suitable pore sizes and grain sizes within the anode functional layer 304.

The anode functional layer 304 can be a thin and substantially planar layer of material, having an average thickness of not greater than about 1 mm, such as not greater than about 700 microns, not greater than about 500 microns, not greater than about 200 microns, not greater than about 150 microns, such as not greater than about 100 microns, or even not greater than about 50 microns. Still, the anode functional layer 304 can have an average thickness of at least about 0.5 microns, such as at least about 1 micron, at least about 5 microns, at least about 10 microns, at least about 15 microns, or even at least about 20 microns. It will be appreciated that the anode functional layer 304 can have an average thickness within a range between any of the minimum and maximum values noted above.

The anode functional layer 304 can include the same materials as the anode bulk layer 303 described herein. Moreover, the anode functional layer 304 can include a combination of materials, such as a combination of materials from the anode bulk layer 303 and the electrolyte layer 305. The anode bonding layer 302 can include a combination of materials, such as a combination of material from the anode bulk layer 303 and the interconnect layer 301.

It will be appreciated that channels can be formed in particular layers, such as the anode bulk layer and cathode bulk layer for the delivery of gaseous species fueling the reaction.

In particular instances, the SOFC unit cell can be formed such that the functional layer comprises porosity facilitating certain gas diffusion rates (or lower gas diffusion resistance). For example, the gas diffusion rate between the cathode and the electrolyte via the functional layer can be improved with increased first type of porosity having a vertical orientation as opposed to a functional layer formed without a significant portion of porosity having a vertical orientation.

In accordance with one particular embodiment, the operation temperature of the SOFC articles formed herein can be within a range between about 600° C. and about 1000° C.

Example 1

A first SOFC unit cell (sample 1) is formed according to the following methods having the general construction of CB-CFL-E-AFL-AB (CB and AB represent a bulk cathode layer and bulk anode layer, CFL represents a cathode functional layer, E represents an electrolyte layer, and AFL represents an anode functional layer). The CB-CFL-E-AFL-AB construction is formed by laminating tapes or sheets of the CB, CFL, E, AFL and AB layers.

Figure 18:
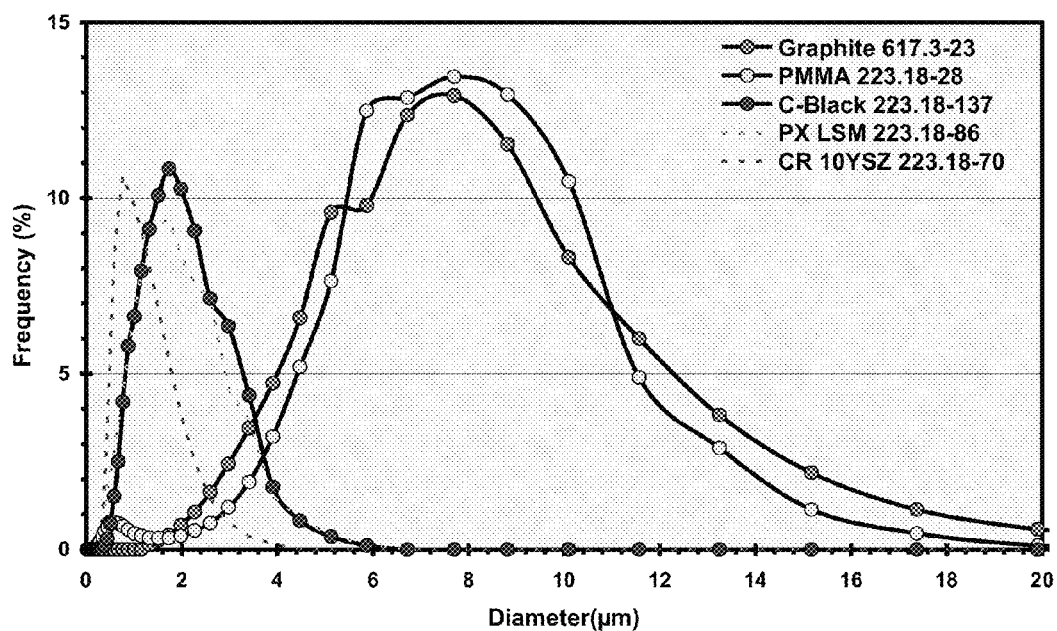
FIG. 18 includes a plot illustrating particle size distributions of powder materials and pore formers according to various embodiments.

The CFL green tape is formed by tape casting a slurry containing a mixture of LSM powder [$(La_{0.8}Sr_{0.2})_{0.98}MnO_3$] commercially available from Praxair and a 8YSZ material commercially available from Unitec. The tape casting is completed using a table-top tape caster available as ZAA 2300 model from Zehntner Testing Instruments (Zehntner, Switzerland). The cathode functional layer powder material has a median particle size between 1-2 microns. The particle size distribution of the powder material is illustrated in FIG. 18.

A single tape is tape cast into a green electrolyte layer (E) from a slurry containing an electrolyte powder material of Al—Mn 8YSZ. The electrolyte powder material has a median particle size between 0.2-0.5 microns. The single green tape of Al—Mn 8 YSZ is a green electrolyte layer and is placed over the green cathode functional layer (CFL).

A single tape is tape cast into a green anode functional layer (AFL) from a slurry containing a mixture of NiO powder commercially available from Novamet and 10YSZ (or 8YSZ) material. The NiO powder and Novamet powders have a median particle size between 0.5-10 microns. The single anode functional layer tape is placed on the other side of electrolyte layer (E).

A single tape is tape cast into a green anode bulk layer (AB) from a slurry containing a mixture of NiO powder commercially available from Novamet and 10YSZ (or 8YSZ) material. The NiO powder and Novamet powders have a median particle size between 0.5-50 microns. Several green anode bulk layer tapes laminted together and placed on the AFL tape to yield a thickness of approximately 1-1.5 mm.

A single tape is tape cast into a green cathode bulk (CB) from a slurry containing a mixture of LSM powder material. The LSM powder material has a median particle size between 1-50 microns. Several tapes of AB layer are placed on the AFL layer to yield a thickness of approximately 1-1.5 mm.

The CB-CFL-E-AFL-AB SOFC unit cell is then uniaxially hot-pressed under a force of 1000-3000 N (corresponding to a pressure of about ~2-5 MPa) on a sample with an approximate diameter of 30 mm with an isothermal hold at a temperature of approximately 1250° C. to about 1300° C. for about 3 hours, in air atmosphere. The cathode functional layer is formed to have an approximate thickness of 30 microns and the electrolyte layer has a thickness of approximately 10-20 microns. The thickness of the AFL layer is approximately 30 microns.

The CB-CFL-E-AFL-AB SOFC unit cell is analyzed and the CFL layer is measured to have a total porosity of approximately 15-40% and having a significant amount of a first type of porosity having a vertical orientation, and a less significant portion of the total porosity is a second and third type of porosity having a random orientation or horizontal orientation. In fact, the CFL layer is calculated to have an average pore angle of approximately 49 degrees. The analysis is conducted by identifying four parameters including pore angle θ, pore elongation rate ε, pore size dm, and pore orientation index k, which were calculated and averaged from 200-600 pores in at least 5 representative SEM cross-sectional pictures take from random locations within the CFL after forming. The method is detailed in the reference by Wang and Atkinson, Acta Materialia, Vol. 59, Issue 6, April 2011, Pg. 2514-2525.

Pore angle is defined as the angle between x axis and the major axes of the pore (the angles from 90-180 were mirrored across the Z-axis). Definitions of other three parameters are as following:

$$\varepsilon = \frac{\sum_i \varepsilon_i d_i^{min}(d_i^{maj} + d_i^{min})d_i^{maj}}{\sum_i d_i^{min}(d_i^{maj} + d_i^{min})d_i^{maj}}$$

$$d_m = \frac{4}{\pi} \frac{\sum_i d_i^{min}(d_i^{maj} + d_i^{min})^2 d_i^{maj}/2}{\sum_i d_i^{min}(d_i^{maj} + d_i^{min})d_i^{maj}}$$

$$k = \ln\left(\frac{\sum_i (\varepsilon_i d_i^{maj} \sin\theta_i)^2}{\sum_i (\varepsilon_i d_i^{maj} \cos\theta_i)^2}\right)$$

Where $d_i^{maj}$ and $d_i^{min}$ are the major and minor axes of the pore.

Figure 6:
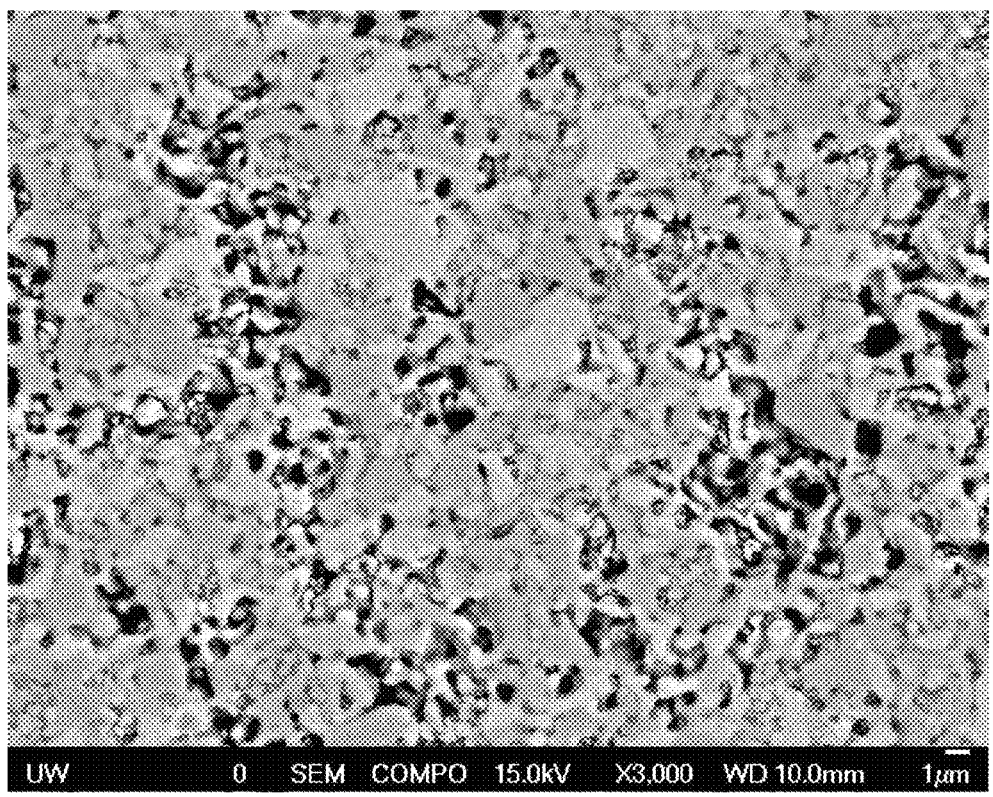
FIG. 6 includes a SEM image of a portion of a functional layer in accordance with an embodiment.

The procedures for measuring the orientation of a representative sample of pores within the CFL is initiated by obtaining a high quality SEM picture with good contrast. Generally, for pores having a size between about 0.1 and about 2 um, the magnification is set to 2000× to 5000×, and for pores having a greater size, the magnification is set to 500× to about 2000×. Typically, at least 200 pores are contained in one SEM picture. At least 2 different SEM photos are viewed on the same CFL to get an accurate and statistically representative sampling. More preferably, at least about 4 different SEM photos are viewed an analyzed from different locations within the same CFL. See, a representative photo in FIG. 6.

Figure 7:
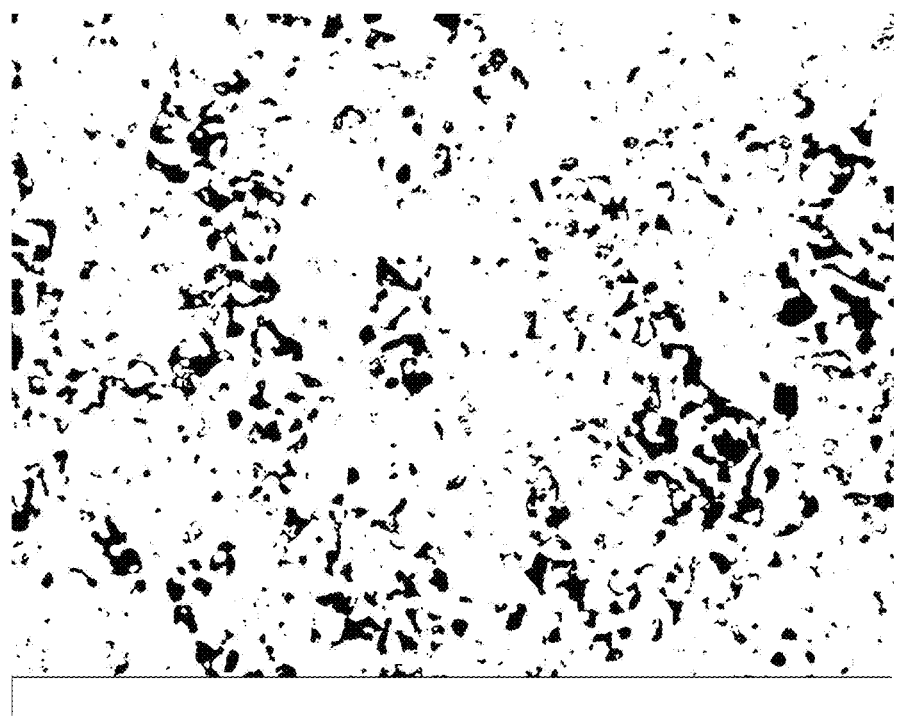
FIG. 7 includes a binary image formed from the SEM image of FIG. 6.

The pores are analyzed using Image J software (available at: http://rsbweb.nih.gov/ij/). The contrast and brightness are adjusted as necessary to aptly define the pores. Adjusting the threshold intensity produces a binary image. See, FIG. 7. A combination of dilating, filling holes, eroding, close and open functions can be used to ensure the binary image is a best match to the original image. After image processing, the pores in the binary image appear as dark "particles" in the processed image.

The binary image can then be analyzed using an analysis function in the Image J software. The pores are represented as ellipses of equivalent area, and the software will provide a list calculating with pore size and pore angle for each pore in the binary image. The list of pore size and pore angle values can then be further analyzed using a standard spreadsheet software (e.g., Excel) to develop average values, standard deviations, etc.

Figure 8:
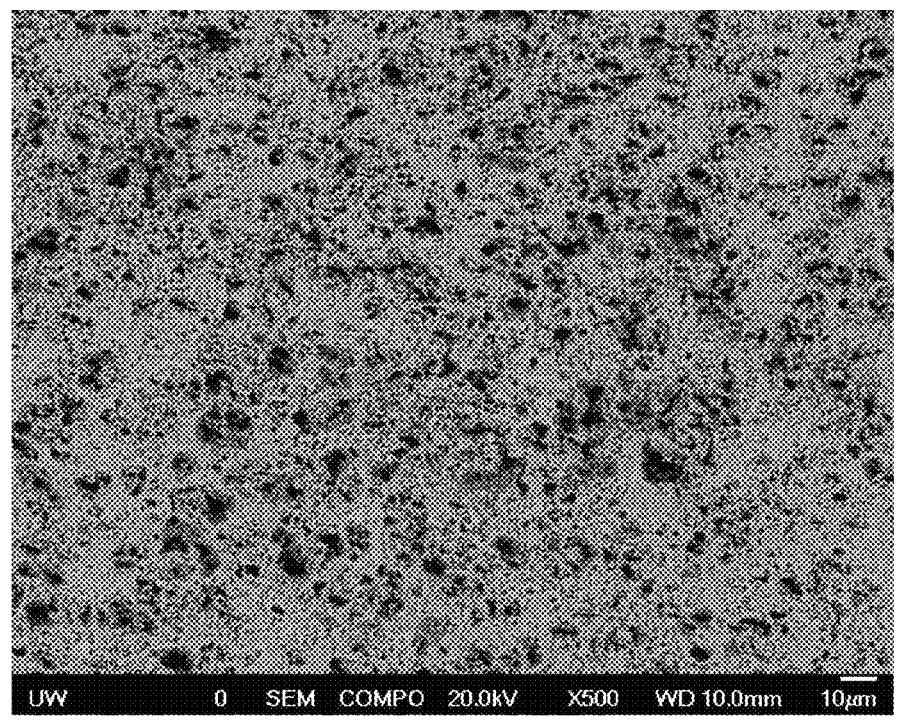
FIG. 8 includes a SEM image of a portion of a comparative functional layer.
Figure 9:
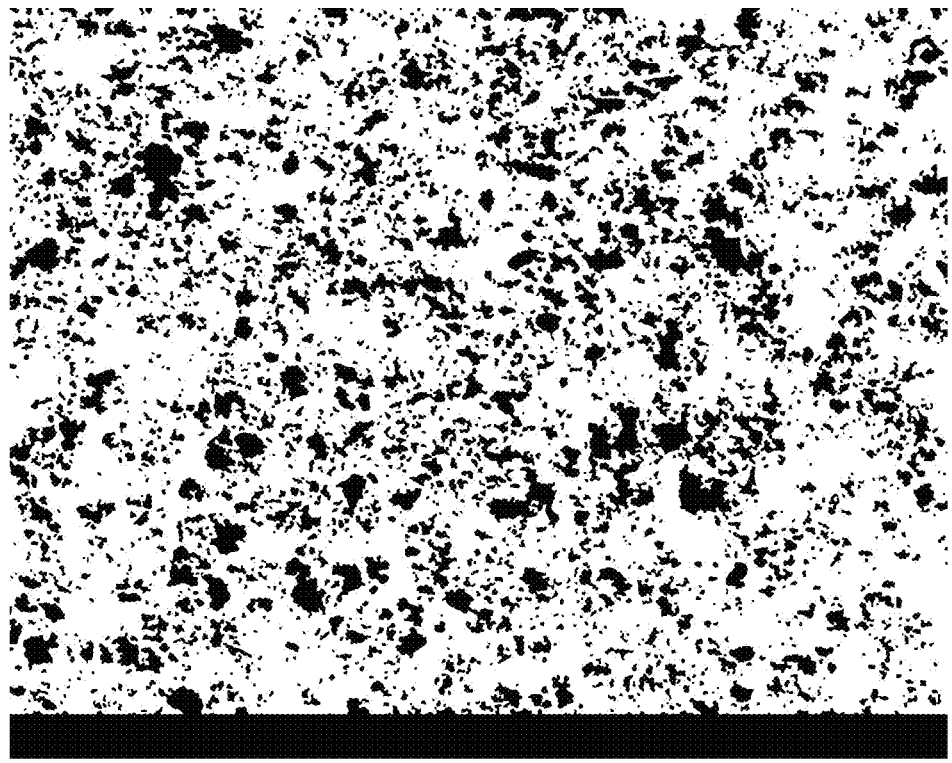
FIG. 9 includes a binary image formed from the SEM image of FIG. 8.

A second SOFC unit cell (Sample 2) is formed using generally the same process used to form Sample 1, except that the cathode functional layer is formed from a slurry including pore forming agents of PMMA having a median particle size of approximately 4-10 microns in an amount of approximately 40% by volume of the slurry. A graphical representation of the particle size distribution of the PMMA is illustrated in FIG. 18. The unit cell was formed at a temperature of approximately 1200° C. using the same pressure. FIG. 8 includes a SEM micrograph of the CFL layer of sample 2, which is measured to have a total porosity of approximately 20-40%, but having a significant amount of the second and third type of porosity having a random orientation or horizontal orientation, and significantly less porosity having a vertical orientation as compared to Sample 1. In fact, the average pore angle of the sample was calculated to be approximately 37 degrees. FIG. 9 includes the binary image of FIG. 8.

Figure 10:
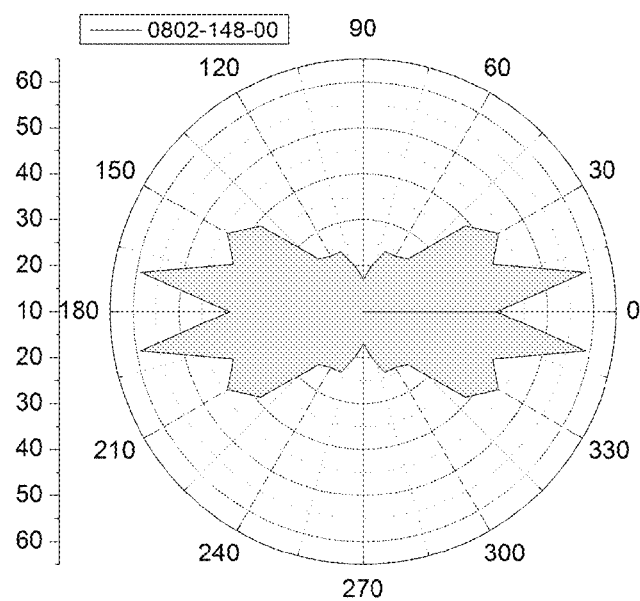
FIG. 10 includes a diagram of a pore according to an example.

A third SOFC unit cell (Sample 3) is formed using generally the same process used to form Sample 1, except that the cathode functional layer is formed from a slurry including pore forming agents of graphite having a median particle size of approximately 5-10 microns in an amount of approximately 20% by volume of the slurry. A graphical representation of the particle size distribution of the graphite is illustrated in FIG. 18. The unit cell was formed at a temperature of approximately 1300° C. and 12 MPa. The CFL layer of Sample 3 was measured to have a total porosity of approximately 11%. The average pore angle of the sample was calculated to be approximately 37 degrees. FIG. 10 illustrates a diagram of a pore in Sample 3.

Figure 11:
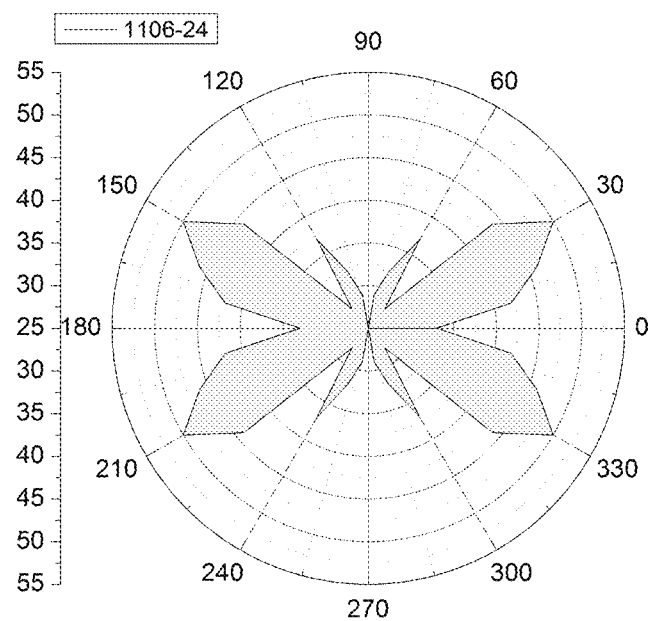
FIG. 11 includes a diagram of a pore according to an example.

A fourth SOFC unit cell (Sample 4) is formed using generally the same process used to form Sample 3, except that the graphite is present in an amount of approximately 40% by volume of the slurry. The unit cell was formed at a temperature of approximately 1300° C. and 12 MPa. The CFL layer of Sample 4 was measured to have a total porosity of approximately 16%. The average pore angle of the sample was calculated to be approximately 41 degrees. FIG. 11 illustrates a diagram of a pore in Sample 4.

Figure 12:
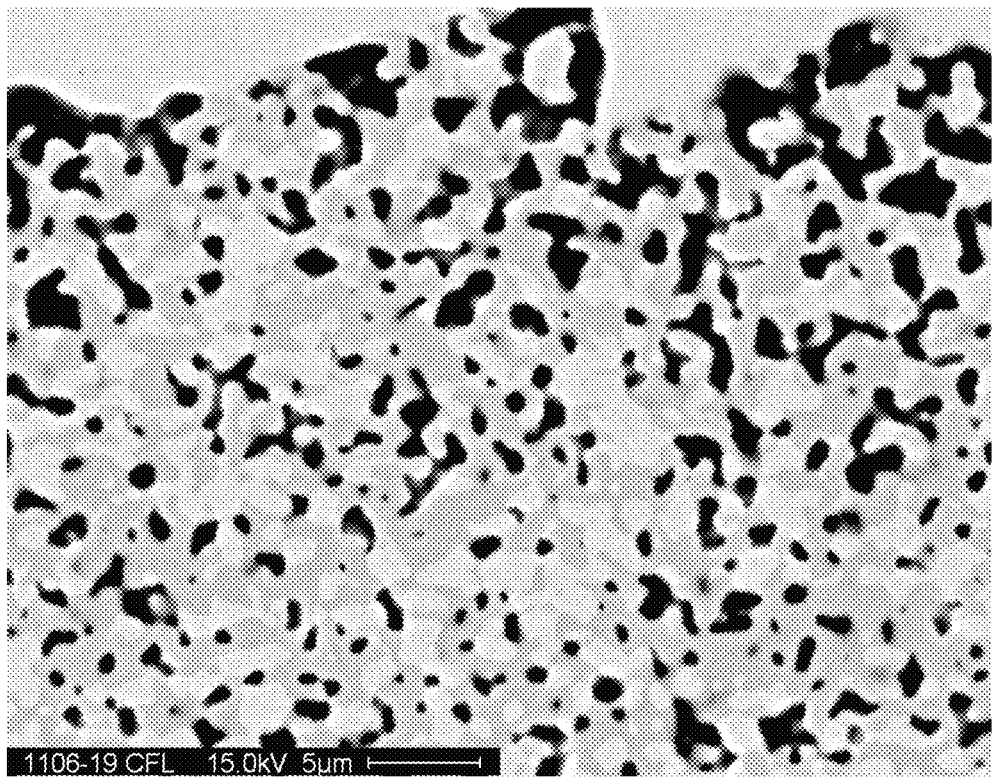
FIG. 12 includes a SEM image of a portion of a functional layer according to an embodiment.
Figure 13:
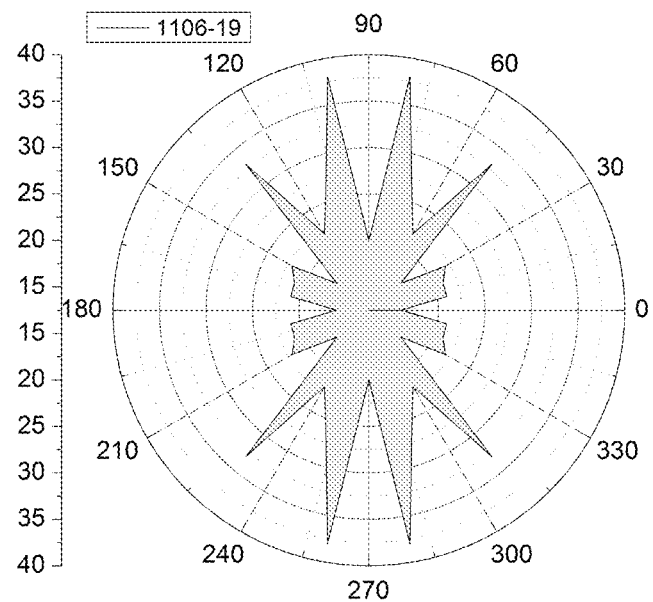
FIG. 13 includes a diagram of a pore according to an example.

A fifth SOFC unit cell (Sample 5) is formed using generally the same process used to form Sample 3, except that the cathode functional layer is formed from a slurry including pore forming agent of carbon black having a median particle size of approximately 2 microns in an amount of approximately 30% by volume of the slurry. A graphical representation of the particle size distribution of the carbon black is illustrated in FIG. 18. The particle size distribution of the carbon black more closely mirrored the particle size distribution of the PMMA or graphite. The unit cell was formed at a temperature of approximately 1300° C. and 12 MPa. A SEM micrograph of the CFL layer of Sample 5 is illustrated in FIG. 12, which is measured to have a total porosity of approximately 16%. Sample 5 has a significant amount of the porosity having a vertical orientation as compared to Samples 2-4. The average pore angle of the sample was calculated to be approximately 48 degrees. FIG. 13 illustrates a diagram of a pore in Sample 5.

Figure 14:
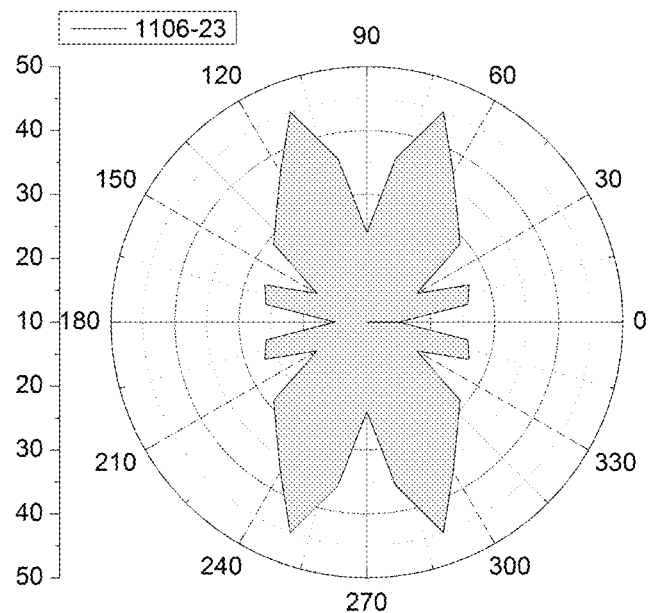
FIG. 14 includes a diagram of a pore according to an example.
Figure 19:
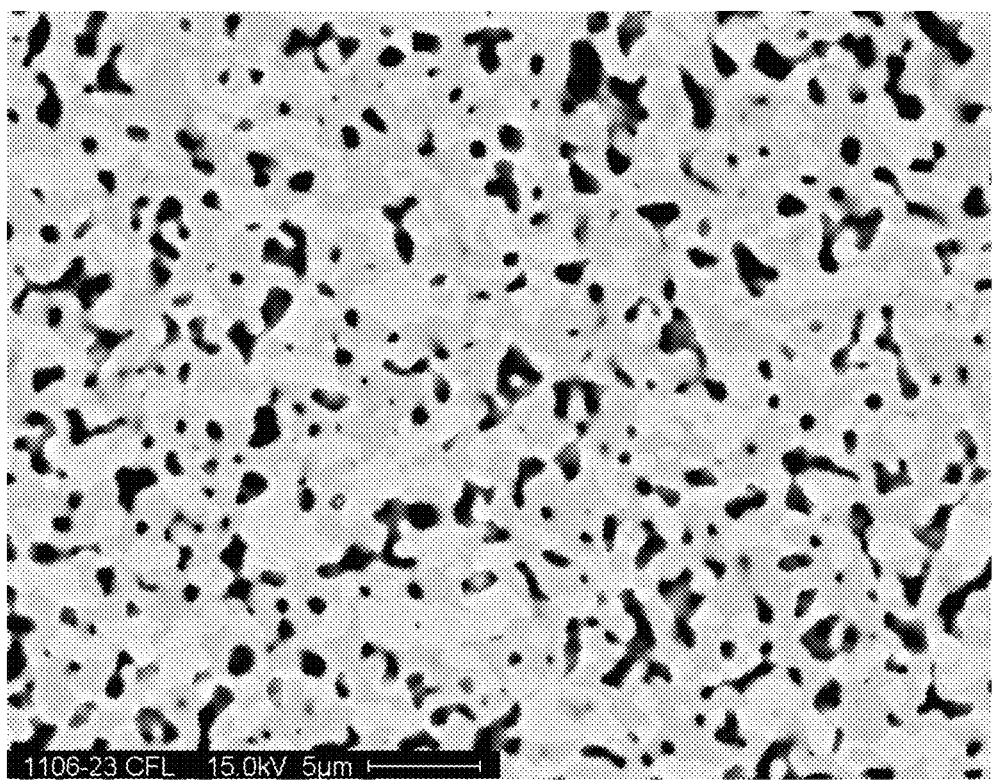
FIG. 19 illustrates a SEM image of a portion of a functional layer according to an embodiment.

A sixth SOFC unit cell (Sample 6) is formed using generally the same process used to form Sample 5, except that the carbon black is present in an amount of approximately 40% by volume of the slurry. FIG. 19 includes a SEM micrograph of the CFL layer of Sample 6, which is measured to have a total porosity of approximately 18%. Sample 6 has a significant amount of the porosity having a vertical orientation as compared to Samples 2-4. The average pore angle of the sample was calculated to be approximately 49 degrees. FIG. 14 illustrates a diagram of a pore in Sample 6.

Figure 15:
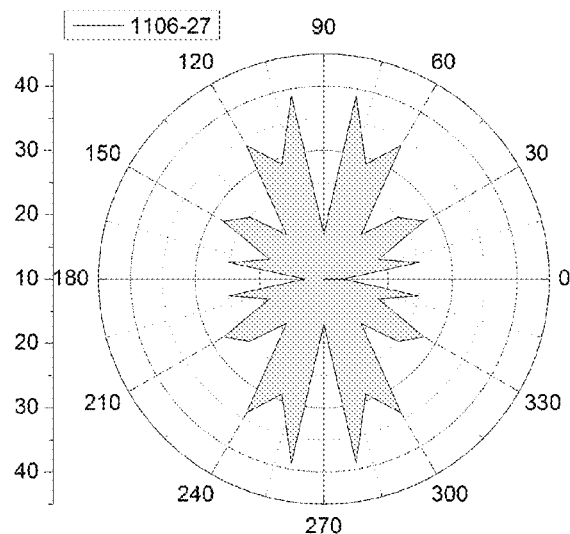
FIG. 15 includes a diagram of a pore according to an example.

A seventh SOFC unit cell (Sample 7) is formed using generally the same process used to form Sample 5, except that the carbon black is present in an amount of approximately 50% by volume of the slurry. Sample 7 was measured to have a total porosity of approximately 16%. Sample 7 has a significant amount of the porosity having a vertical orientation as compared to Samples 2-4. The average pore angle of the sample was calculated to be approximately 47 degrees. FIG. 15 illustrates a diagram of a pore in Sample 7.

Figure 16:
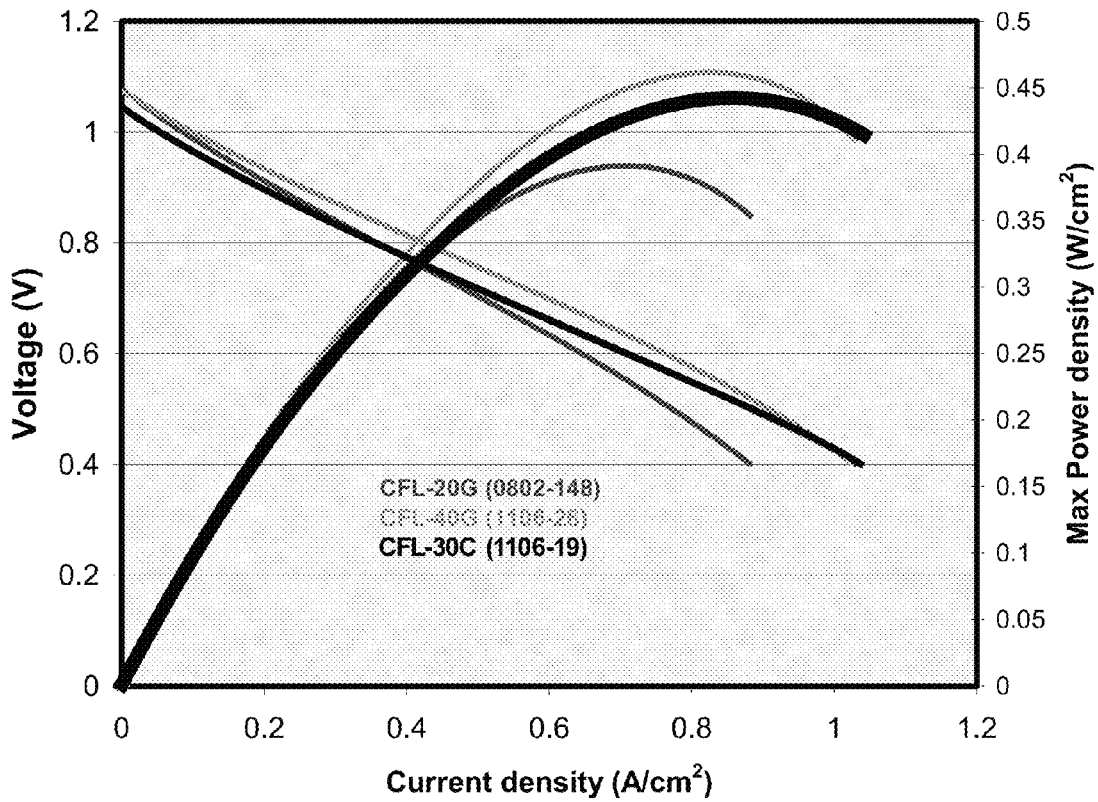
FIG. 16 includes a plot illustrating the voltage and maximum power density according to the examples.
Figure 17:
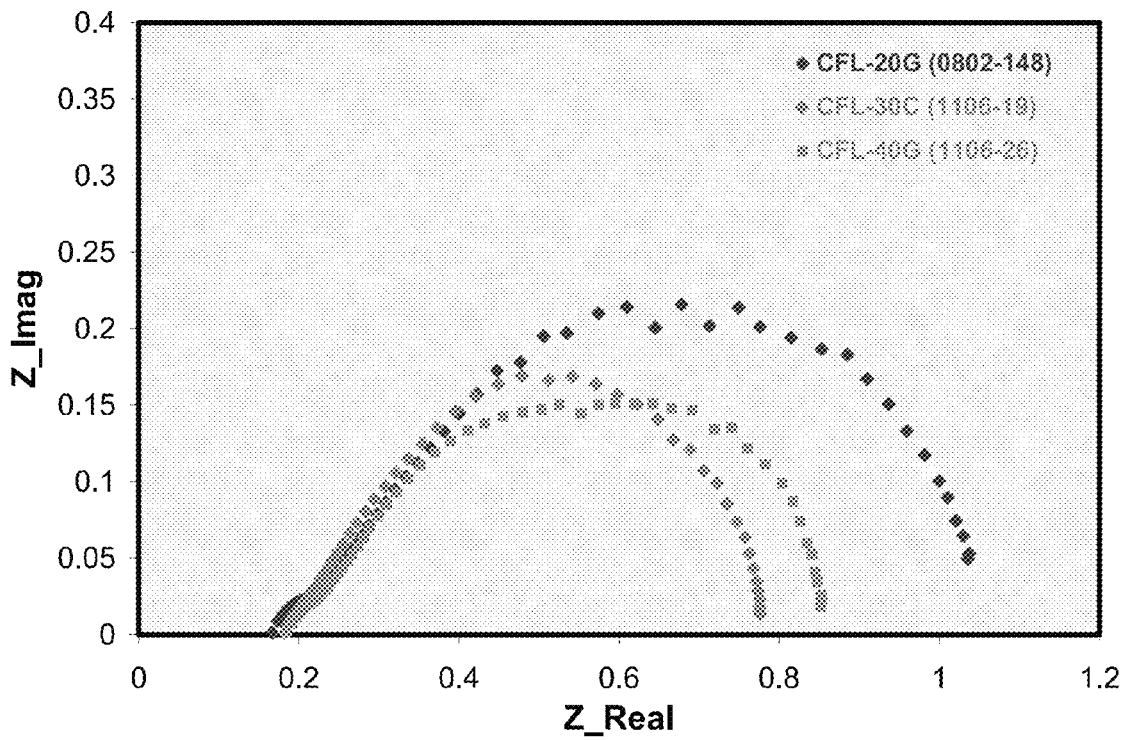
FIG. 17 includes a plot illustrating the impedance according to the examples

Samples 3, 4, and 5 are evaluated for their electrochemical performance. FIG. 16 illustrates a graph of the voltage (V) and max power density (W/cm$^2$) plotted against the current density (A/cm$^2$). The impedance is also measured and illustrated in FIG. 17. The embodiments herein represent a departure from the state-of-the-art. While hot pressing has been used in the past in conjunction with the formation of highly dense layers, it is generally not utilized in the formation of thin layers where control of type, orientation, and size of porosity is desired. By contrast, the present embodiments have detailed a method of controlling aspects of porosity in thin layers of SOFC unit cells via uniaxial hot pressing. Notably, it has been discovered that in the context of forming a unitary structure (e.g., SOFC unit cell) having a combination of different layers, particularly layers of various densities in close contact with each other, the processes disclosed in the embodiments herein facilitate improved formation of such structures. The foregoing embodiments detail a combination of factors, including but not limited to, raw material powders, pore forming agents, particle size distribution of the pore forming agent, correlation of particle size distribution of the pore forming agent with the particle size distribution of the powder material, and processing parameters of the uniaxial hot pressing operation that can facilitate the formation of a thin layer (e.g., CFL) having controlled morphological features, which may include total porosity, type of porosity, and size of porosity. According to the embodiments herein, such features facilitate a combination of advantages, such as improved gas diffusion properties, and improved electrochemical properties.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A solid oxide fuel cell (SOFC) article comprising:
an SOFC unit cell comprising a functional layer having an average thickness of not greater than about 100 µm,
wherein the functional layer comprises a first type of pores having:
an aspect ratio of length:width, wherein the length is greater than the width and a dimension of the length defines a pore axis, the pore axis forming an angle that is greater than about 45 degrees from a horizontal axis defining a functional layer width; and
a vertical orientation with respect to the horizontal axis, wherein the first type of pores is present in an amount of at least 20% of the total volume of porosity of the functional layer.

2. The SOFC article of claim 1, wherein the first type of pores is present in an amount of at least about 50% of the total volume of porosity of the functional layer.

3. The SOFC article of claim 1, wherein the first type of pores has an aspect ratio of length:width, wherein the length is greater than the width and a dimension of the length is substantially aligned with thickness of the functional layer.

4. The SOFC article of claim 1, further comprising a second type of pores having a random orientation.

5. The SOFC article of claim 4, further comprising a third type of pores having a horizontal orientation.

6. The SOFC article of claim 1, wherein the functional layer comprises at least about 5 vol % porosity for the total volume of the functional layer.

7. The SOFC article of claim 1, wherein the first type of pores has an average pore size that is not greater than about 25 µm.

8. The SOFC article of claim 1, wherein the functional layer comprises not greater than about 45 vol % porosity for the total volume of the functional layer.

9. The SOFC article of claim 1, wherein the average thickness of the functional layer is at least about 1 µm.

10. The SOFC article of claim 1, wherein the SOFC unit cell further comprises a first electrode comprising a cathode, wherein the cathode is in direct contact with the functional layer, and wherein the cathode comprises a bulk layer portion having a porosity that is greater than a porosity of the functional layer.

11. The SOFC article of claim 1, wherein the SOFC unit cell further comprises a dense layer overlying the functional layer.

12. The SOFC article of claim 1, wherein the functional layer is disposed between an electrode and a dense layer.

13. The SOFC article of claim 1, wherein the angle is greater than about 50 degrees from the horizontal axis.

14. The SOFC article of claim 1, wherein the functional layer comprises a vertical axis corresponding to a direction of force that is applied during a pressing operation to form the SOFC unit cell, wherein the vertical axis is perpendicular to the horizontal axis, wherein the vertical axis extends in a direction parallel to a thickness of the functional layer.

15. The SOFC article of claim 14, wherein the pressing operation includes a hot pressing operation.

16. A solid oxide fuel cell (SOFC) article comprising:
   a SOFC unit cell comprising a functional layer having an average thickness of not greater than about 100 microns, wherein a portion of a porosity of the functional layer comprises:
      a first type of pores having:
         an aspect ratio of length:width of at least about 1.1:1, wherein a dimension of the length defines a pore axis, the pore axis forming an angle that is greater than about 45 degrees from a horizontal axis defining a functional layer width; and
         a vertical orientation with respect to the horizontal axis,
         wherein the first type of pores is present in an amount of at least 20% of the total volume of porosity of the functional layer; and
      a second type of pores having a non-vertical orientation with respect to the horizontal axis of the functional layer.

17. The SOFC article of claim 16, wherein the aspect ratio of length:width is at least about 1.2:1.

18. The SOFC article of claim 16, wherein the first type of pores is present in an amount of at least about 50% of the total volume of porosity of the functional layer.

19. A method of forming a solid oxide fuel cell SOFC article, the method comprising:
   forming a green functional layer having a content of pore forming agents; and
   uniaxial hot pressing the green functional layer to form a finished functional layer under transformation conditions selected from the group of conditions consisting of temperature, pressure, time, and atmosphere, wherein a significant portion of pores formed from the pore forming agents vertically oriented with respect to a horizontal axis during uniaxial hot pressing,
   wherein the finished functional layer comprises an average thickness of not greater than about 100 μm and a first type of pores, wherein the first type of pores;
      has an aspect ratio of length:width, wherein the length is greater than the width and a dimension of the length defines a pore axis, the pore axis forming an angle that is greater than about 45 degrees from a horizontal axis defining a functional layer width;
      has a vertical orientation with respect to the horizontal axis; and
      is present in an amount of at least 20% of the total volume of porosity of the functional layer.

20. The method of claim 19, wherein the content of the pore forming agents have a median size of less than about 20 μm; and wherein the finished functional layer comprises an average thickness of not greater than about 100 μm.

* * * * *